United States Patent [19]

Egner-Walter et al.

[11] Patent Number: 5,894,628
[45] Date of Patent: Apr. 20, 1999

[54] WIPER ARM FOR A WINDSHIELD WIPER MECHANISM, PARTICULARLY FOR MOTOR VEHICLES

[75] Inventors: Bruno Egner-Walter, Heilbronn; Eckhardt Schmid, Brackenheim; Wolfgang Scholl, Gemrigheim, all of Germany

[73] Assignee: ITT Automotive Europe GmbH, Frankfurt, Germany

[21] Appl. No.: 08/714,143

[22] PCT Filed: Feb. 18, 1995

[86] PCT No.: PCT/EP95/00597

§ 371 Date: Sep. 16, 1996

§ 102(e) Date: Sep. 16, 1996

[87] PCT Pub. No.: WO95/25025

PCT Pub. Date: Sep. 21, 1995

[30] Foreign Application Priority Data

Mar. 19, 1994 [DE] Germany ............... 44 08 732

[51] Int. Cl.⁶ ...................................................... B60S 1/34
[52] U.S. Cl. .......................... 15/250.34; 403/21; 403/12
[58] Field of Search .................... 15/250.34, 250.351, 15/250.352, 250.31, 250.3; 403/11, 21, 12

[56] References Cited

U.S. PATENT DOCUMENTS

| 2,684,258 | 7/1954 | Krohm | 15/250.34 |
| 2,738,535 | 3/1956 | Horton | 15/250.34 |
| 2,885,230 | 5/1959 | Terpin | 15/250.34 |
| 2,980,453 | 4/1961 | Nesson | 15/250.34 |
| 3,036,847 | 5/1962 | Ziegler | 15/250.34 |
| 3,429,597 | 2/1969 | Krohm | 15/250.34 |

FOREIGN PATENT DOCUMENTS

| 666076 | 7/1963 | Canada | 15/250.34 |
| 187965A3 | 7/1986 | European Pat. Off. . | |
| 2640211A1 | 6/1990 | France . | |
| 1099875 | 1/1955 | Germany . | |
| DBP1059785 | 6/1959 | Germany . | |
| 4140959A1 | 11/1992 | Germany . | |
| 1836244A3 | 2/1981 | U.S.S.R. . | |
| 1063668 | 8/1990 | U.S.S.R. . | |
| 637671 | 5/1950 | United Kingdom . | |
| 827427 | 2/1960 | United Kingdom . | |
| WO83/02094 | 6/1983 | WIPO . | |

*Primary Examiner*—Gary K. Graham
*Attorney, Agent, or Firm*—J. Gordon Lewis

[57] ABSTRACT

A wiper arm mounting system for mounting a wiper arm rigidly and removably to a drive shaft includes a mounting part and a threaded fastening element that is realized in the form of a fastening nut or fastening screw with the fastening element acting upon the drive shaft in the axial direction. The fastening element is held on the mounting part in captive fashion at least approximately in the mounting position, such that the wiper arm can be pulled off the drive shaft (8) by means of rotating the fastening element.

2 Claims, 16 Drawing Sheets

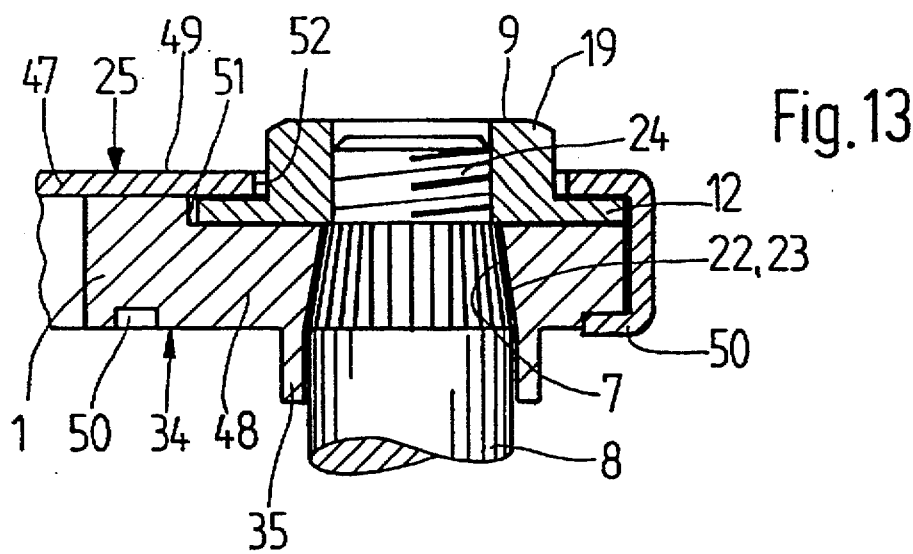
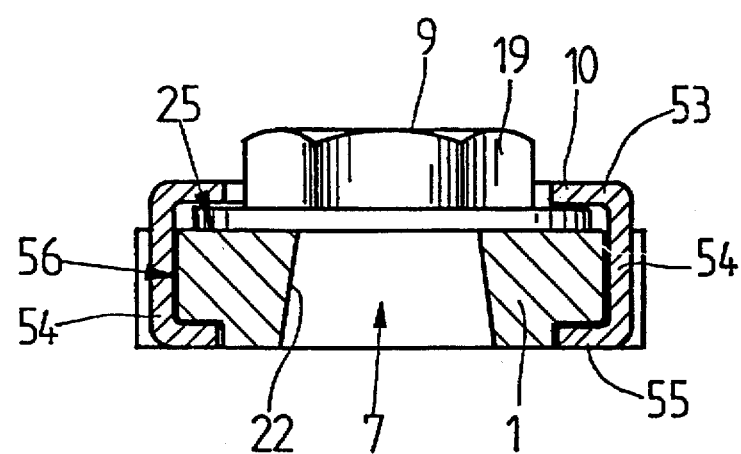
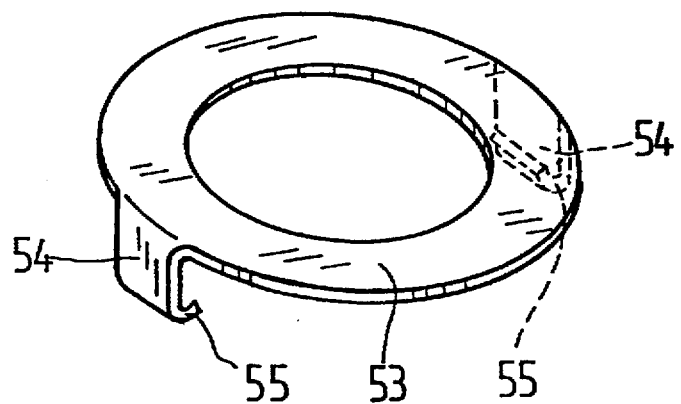

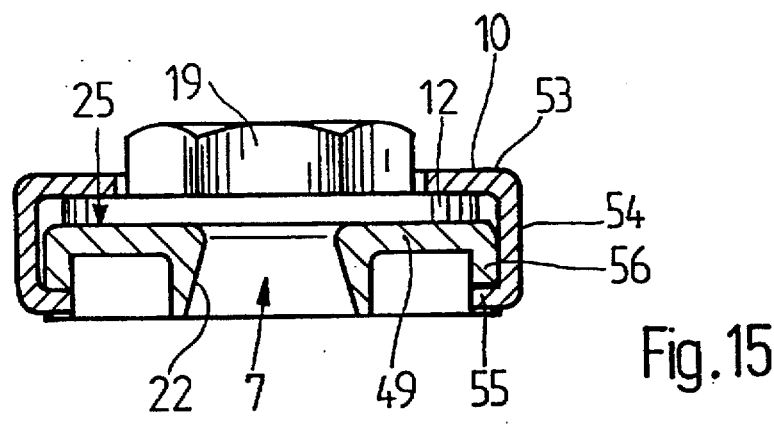
Fig. 15
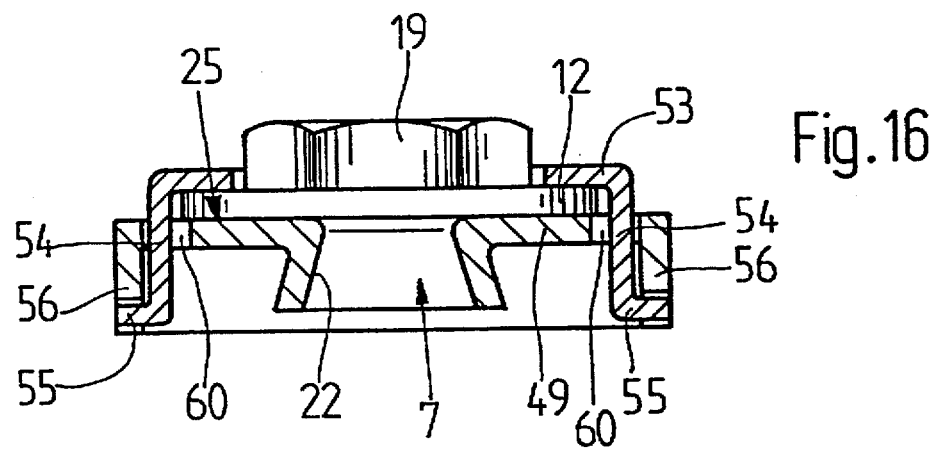
Fig. 16
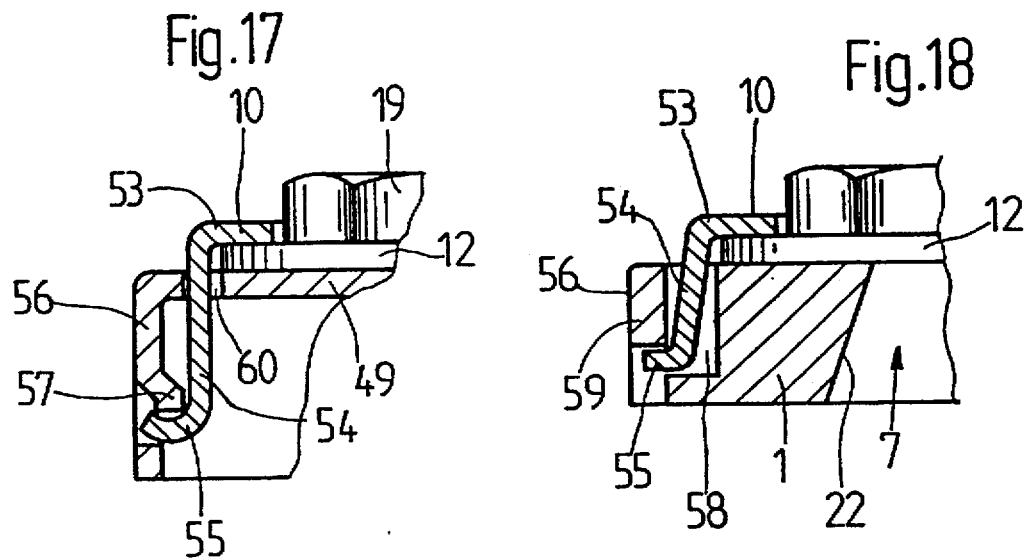
Fig. 17
Fig. 18

5,894,628

WIPER ARM FOR A WINDSHIELD WIPER MECHANISM, PARTICULARLY FOR MOTOR VEHICLES

This application is a 371 of PCT/EP95/00597, filed Feb. 18, 1995.

FIELD OF THE INVENTION

The invention pertains to a wiper arm for a windshield wiper mechanism, particularly for motor vehicles, wherein the wiper arm is rigidly mounted on the end of a drive shaft that is driven such that it carries out reciprocating pivoting motion. Consequently, the reciprocating pivoting motion of the drive shaft causes a reciprocating wiping movement of the wiper arm and the wiper blade fastened thereon within a corresponding wiping angle.

BACKGROUND OF THE INVENTION

Most wiper arms of this type comprise a mounting part with an opening that is usually realized in the form of an inner cone. This opening extends coaxially with the drive shaft, on the end of which the wiper arm is then mounted. When mounting the wiper arm on the drive shaft, the opening of the mounting part is attached to the end of the drive shaft. The mounting part of the wiper arm is pressed onto the end of the drive shaft and rigidly fastened by screwing a separate fastening nut or separate fastening screw on or in the end of the drive shaft, with a washer being arranged between the mounting part and the fastening nut or fastening screw.

Wiper arms of this type are already known.

DE-GM 71 04 759 discloses a wiper arm with a mounting part that is realized in the form of a die-cast part and provided with an opening in the shape of an inner cone. The opening of the mounting part is attached to a knurled cone arranged on the end of a solid drive shaft and held by a separate fastening nut, with the fastening nut being screwed on the threaded stem of the drive shaft that extends through the opening in the mounting part in the form of an extension of the knurled cone. A covering cap of plastic covers the attached mounting part and the fastening nut.

DE 41 40 959 A1 discloses a different wiper arm in which the mounting part is realized in the form of a sheet metal body. A cast metal part that is provided with a conical opening for rigidly mounting the wiper arm on the conical end of a drive shaft is fastened to the aforementioned sheet metal part. This wiper arm is mounted on the drive shaft by attaching the mounting part onto the end of the drive shaft which is provided with an outer cone and a cylindrical threaded projection. A separate fastening nut is then attached. Consequently, the cast metal part of the mounting part is pressed onto the cone arranged on the end of the drive shaft and rigidly held thereon.

A wiper arm with a mounting part that is realized in the form of a die-cast part with a conical opening is known from DE 41 17 107 A1 or DE 41 34 980 A1. This wiper arm is fastened to the end of a drive shaft as described previously by utilizing a separate fastening nut. In this case, the drive shaft is realized in the form of a hollow shaft, with the hollow space of the drive shaft being used as a lead-through for the windshield-washing fluid. The mounting part and the fastening nut as well as the hose connection on the end of the drive shaft for conveying the windshield-washing fluid are covered with a covering cap after the wiper arm is mounted on the drive shaft.

All these known wiper arms are associated with the disadvantages described below.

When mounting the wiper arm on the drive shaft, a separate fastening nut must be screwed on the end of the drive shaft after the opening of the mounting part of the wiper arm is attached to the end of the drive shaft. This requires the additional transport and/or storage of fastening nuts as well as an increased mounting expenditure.

After a certain time, the wiper arm may require removal or replacement, e.g., if the windshield becomes damaged, the motor vehicle is repainted or the wiper arm is deformed due to excessive stress. However, the removal of the wiper arm is very complicated in most instances because the mounting part is very firmly seated on the drive shaft since it is pressed onto the end of the drive shaft. Once the fastening nut is unscrewed, the wiper arm can only be removed from the drive shaft with a very high expenditure of force. In this case, intact wiper arms are frequently bent or damaged such that they are rendered unusable and must be replaced. If unsuitable tools are used, the drive shaft or its bearings are frequently damaged, i.e., these components also must be replaced and the repair costs are significantly increased. Hollow drive shafts with lead-through for the windshield-washing fluid are particularly sensitive in this respect. If such drive shafts are damaged during the removal of the wiper arm, the repair costs are also increased.

SUMMARY OF THE INVENTION

An object of the present invention is to provide a wiper arm less costly to mount on the drive shaft, and uncomplicated to remove from the drive shaft without damaging the drive shaft or the wiper arm.

According to the invention, this objective is attained with a wiper arm having a fastening element in the form of a fastening screw or fastening nut which is held on the mounting part of the wiper arm in captive fashion at least approximately in the mounting position. The fastening element is configured to facilitate easy removal of the wiper arm off the drive shaft. The fastening element is held on the mounting part of the wiper arm in such a way that the wiper arm can be carefully pulled off the drive shaft with a relatively low expenditure of force by simply loosening or unscrewing the fastening element.

This basic solution provides the advantage that the fastening element is already situated in the mounting position on the wiper arm to be mounted on the drive shaft. Consequently, the fastening element need not be transported and stored separately. In addition, the fastening element need not be handled as a separate component during the mounting process. The complete wiper arm with the fastening element simply must be attached to the end of the drive shaft, with a precise centering of the fastening element taking place during this attachment. The fastening element is then attached. This mounting process is significantly less complicated than solutions known thus far. One additional advantage of the solution according to the invention can be seen in the careful removal of the wiper arm from the drive shaft which requires very little force and no additional tools except the tool used for tightening and loosening the fastening element.

According to an embodiment, a fastening nut is arranged on the upper side of the wiper arm mounting part which opposes the windshield to be cleaned in the form of an axial extension of the opening in the mounting part that serves for mounting the wiper arm on the drive shaft, with the fastening nut being aligned at least approximately coaxially with the aforementioned opening in the mounting part. In this case, the fastening nut can be turned about its axis and held such that it can be moved relative to the mounting part in the axial direction within a limited range. The axial moving range is limited by one or more limit stops that are connected to the mounting part and, in addition to a holding function, ensure the pull-off function of the fastening nut.

During the axial unscrewing movement, the fastening nut comes in contact or effectively engages with the mounting part at the end of the axially limited moving range and pulls the entire wiper arm with the mounting part off the drive shaft on which it is firmly seated. The required pulling force of the fastening nut is relatively low and carefully transferred from the fastening nut to the drive shaft via the fastening thread and onto the mounting part via the limit stops. The drive shaft and the mounting part of the wiper arm absorb these oppositely directed force components without becoming damaged. Consequently, the wiper arm can be carefully removed from the drive shaft with simple conventional tools and without damaging the wiper arm and/or the drive shaft or its bearings, i.e., the wiper arm can be reused.

It is also advantageous to arrange a washer between the wiper arm mounting part and the fastening nut or fastening screw. In light of the relatively high pressing forces that occur during the mounting of the wiper arm on the drive shaft, this washer should be correspondingly stable. The underside of the fastening nut or fastening screw does not move on the mounting part of the wiper arm, but rather on the washer that adjoins the mounting part. Consequently, the surface of the mounting part is protected. This represents a particularly advantageous aspect if a layer of enamel is applied to the mounting part.

If the washer is held on the underside of the fastening nut, the complete arrangement of the wiper arm and the fastening nut can be simplified. The washer can be attached to the mounting part of the wiper arm simultaneously with the fastening nut in one single production step.

In a very simple and cost-efficient embodiment, the underside of the fastening nut which adjoins the mounting part of the wiper arm is provided with a radially extending, circumferential collar that is preferably cylindrical. One or more limit stops that are connected to the mounting part of the wiper arm overlap this collar. If only one limit stop is provided, said limit stop should extend over most of the circumferential collar so as to attain a uniform distribution or uniform introduction of the forces for pulling off the wiper arm.

If a small structural height is desired, in particular, in a mounting part that is realized in the form of a cast metal part, the mounting part can be provided with a preferably cylindrical recess on the upper side that faces away from the windshield to be cleaned. The opening for mounting the wiper arm on the drive shaft ends in the base of this recess. The fastening nut is arranged inside this recess in at-least partially counterbore fashion, with the underside of said fastening nut adjoining the base of the recess or the washer situated at this location. The limit stops arranged above the collar also extend inside this recess. In addition, the recess can be covered by means of a relatively small covering cap such that an attractive appearance is attained.

A pair of pins can be used to form a quite simple, but rather robust and reliable type of limit stop. These pins form a bridge over the recess and are arranged above the collar in flush bores arranged in the wall that surrounds the recess. The pins are situated on opposite sides of the fastening nut and extend in a plane perpendicular to the rotational axis of the fastening nut, at least approximately parallel to one another. The pins and the corresponding flush bores can be aligned parallel or perpendicular to the imaginary central longitudinal axis of the mounting part. Depending on the geometric ratios of the mounting part, the intensity of the forces to be transmitted and the friction between the collar and the limit stop, a person skilled in the art is able to select the correct or optimal cross-sectional shape of the pins from a variety of round, rectangular or differently profiled cross sections.

In yet another embodiment, the fastening nut is only held on the mounting part by the limit stops if so required or deemed advantageous, i.e., when mounting the wiper arm on the drive shaft and removing the wiper arm from the drive shaft. The limit stops can be removed while the fastening nut is screwed on the threaded projection of the drive shaft. This particular embodiment is advantageous if the limit stops have an unattractive appearance.

The removable limit stops are advantageously formed by two parallel pins that are arranged at a distance from one another and rigidly connected to one another at one end by a bridge-like element. This two-prong fork can be inserted into or removed from correspondingly parallel, flush bores from the outside of the mounting part, with said bores extending at least through one wall of the mounting part.

Additional advantageous variations for mounting a fastening nut in a recess of the mounting part of a wiper arm are disclosed.

In one such variation, a shoulder arranged radially adjacent to the collar of the fastening nut is provided on the bottom edge of the recess. The shoulder extends continuously in the circumferential direction or in the form of sectors, with the individual sectors being distributed over the circumference. The shoulder is at least slightly higher than the collar of the fastening nut so as to ensure that the fastening nut can be turned. A perforated disk lies on the shoulder and overlaps the collar of the fastening nut with its inner edge. Since the perforated disk is additionally fixed on the mounting part, it acts as a limit stop for the collar of the fastening nut. The upper part of the fastening nut protrudes through the perforation of the perforated disk.

In yet another variation, a perforated disk lies loosely on the collar of the fastening nut, with a lock washer being arranged above the perforated disk such that it radially overlaps this perforated disk. In addition, the lock washer is held or fixed on the walls of the recess. In this case, the lock washer forms the limit stop for the collar of the fastening nut.

A clamping bridge that forms a limit stop is arranged above the collar of the fastening nut with its inner edge, with the outer edge or sections thereof being supported by the walls of the recess.

A radially split washer that acts as a limit stop for the collar of the fastening nut is arranged in the wall of the recess such that it is axially supported and can be radially moved within a certain range. The inner edge of the split washer radially protrudes into the recess. The collar of the fastening nut is stepped. The lower part of the collar is conically tapered in such a way that it can be pressed through the inner opening of the split washer while temporarily widening the lock washer. The diameter of the upper part of the stepped collar is slightly smaller than the inner diameter of the split washer in its normal condition. After the conical part of the collar has been pressed through the split washer, said split washer assumes its original shape and size on the upper part of the collar and consequently acts as a limit stop.

The previously described variations directed to retention of the fastening nut within a recess in the mounting provide the advantage of a small structural height and a counterbore arrangement of the fastening nut. The recess in the mounting part can also be closed by a relatively small covering cap in this case.

Also disclosed is a wiper arm that can be manufactured in particularly simple fashion. The mounting part of this wiper arm consists of a sheet metal part that has an essentially U-shaped cross section and is provided with a cast metal insert, with the opening for mounting the wiper arm on the drive shaft being arranged in the cast metal part. The rear part of the sheet metal part is provided with an aperture. The cast metal part that comprises the opening for mounting the wiper arm on the drive shaft is arranged on the sheet metal part underneath the aperture and fastened thereon by means of bent regions of the sheet metal part that are especially realized in the form fastening tabs. The cast metal part is provided with a recess that extends concentric to the opening underneath the aperture, with the fastening nut and its collar being arranged in said recess. The edge of the recess in the sheet metal part overlaps the collar of the fastening nut in the form of a limit stop, with the upper part of the fastening nut projecting through the aperture such that it protrudes above the upper side of the sheet metal part.

Related variations for attaching the fastening nut on a mounting part of the wiper arm in which the fastening nut adjoins the upper side of the mounting part, i.e., the rear part of the mounting part are also disclosed.

In one such variation, a perforated disk is arranged above the collar of the fastening nut and overlaps said collar and, if so required, a washer, with the upper part of the fastening nut protruding through the perforation of the perforated disk. In this case, the perforated disk also comprises projecting fastening sections, by means of which it is fastened to the mounting part of the wiper arm. In this case, the perforated disk forms the limit stop for the collar of the fastening nut.

In order to reduce the space requirements as well as the material and the weight of this solid and robust embodiment, another embodiment of the perforated disk is directly attached to the fastening nut without a collar. For this purpose, the underside of the fastening nut has a correspondingly stable, hollow-cylindrical extension that extends through the perforation of the perforated disk, with the edge of said extension being flanged on the underside of the perforated disk. This flange is realized in such a way that the fastening nut can be turned relative to the perforated disk and the pull-off function of the fastening nut is ensured. This means that the flange must be able to transmit the required pulling forces from the fastening nut to the perforated disk. Such a fastening nut with a flanged perforated disk simplifies the attachment of the fastening nut on the mounting part of the wiper arm.

The outer circumference of the perforated disk comprises at least two opposing fastening sections or several fastening sections that are distributed over the circumference and project from the perforated disk, with said fastening sections being fastened to the mounting part in preferably positive fashion depending on the design, shape and size of the wiper arm mounting part. The fastening sections can extend axially outward along one side wall of the mounting part, wherein a groove-like recess can also be provided in the side wall for accommodating the fastening sections. The ends of the fastening sections are bent inwardly and engage underneath the side wall of the mounting part or a shoulder in the side wall. However, the ends of the fastening sections may also engage an undercut or recess or aperture in the side wall of the mounting part.

In yet another variation, apertures in the form of channels extend at least approximately in the axial direction in the rear part of the mounting part. The fastening sections project from the outer edge of the perforated disk and extend through or in the apertures or channels and are anchored on the mounting part by means of their bent ends. Depending on the design and size of the mounting part, the ends of the fastening sections are bent inwardly or outwardly and engage behind the underside of the rear part or the lower edge of the side wall of the mounting part or a projection or shoulder or undercut of the mounting part. However, the ends of the fastening sections may also engage into corresponding recesses or apertures.

The attachment of the fastening nut on the mounting part of the wiper arm is realized in particularly simple fashion if the fastening sections of the perforated disk are realized in spring-like fashion. The fastening nut with the perforated disk can be simply snapped on the mounting part. The process of snapping the fastening nut on the mounting part is additionally simplified by providing correspondingly slanted surfaces on the fastening sections of the perforated disk and/or on the regions of the wiper arm mounting part which correspond to these fastening sections.

The wiper arm can also be provided with a recess on its upper side, with the fastening nut and, if so required, a washer inserted into this recess. In this case, the opening for mounting the wiper arm on the drive shaft ends in the recess. The recess is, relative to the longitudinal extent of the wiper arm, open either laterally or toward the shorter end that opposes the wiper blade mounting part. This opening forms a region for accommodating the fastening nut and, if so required, the washer. A groove is arranged in the wall of the recess or at least in the side walls of the open recess. If an open recess is provided, the shape and size of this groove are realized in such a way that the fastening nut with its collar and, if so required, the corresponding washer can be laterally pushed into the recess, and that the upper side of the nut overlaps the collar of the fastening nut with at least certain sections and acts as a limit stop. The fastening nut is pushed into the recess until it is at least approximately situated in the mounting position, with the region in which the fastening nut is inserted being blocked by a securing element. Consequently, the fastening nut is held on the wiper arm in captive fashion, with the pull-off function for the wiper arm being simultaneously ensured. The design of the securing element is described in detail below in connection with additional embodiments of wiper arms according to the invention.

An embodiment of the wiper arm according to the invention has the entire mounting part in the form of a cast metal part, or the mounting part consists of a sheet metal part that is provided with an insert in the form of a cast metal part. In any case, the opening for mounting the wiper arm on the drive shaft includes an inner cone which is arranged in the cast metal part.

A collar of one such embodiment is integrally formed onto the upper side of the cast metal part which corresponds to the upper side of the mounting part, with said collar at least partially surrounding the opening for mounting the wiper arm on the drive shaft. The collar, relative to the geometric axis of the opening for mounting the wiper arm on the drive shaft, is radially open at least toward one side in such a way that a region for inserting the fastening nut is formed. The fastening nut with its collar is laterally inserted underneath this collar such that the upper part of the fastening nut projects from the top of the collar in the form of an axial extension of the mounting opening. In this case, the region for inserting the fastening nut is also blocked by a securing element such that the fastening nut is held in the approximate mounting position. The collar that at least overlaps the collar of the fastening nut with certain sections acts as a limit stop and ensures the pull-off function in connection with the fastening nut.

In an alternative embodiment, a cast metal part is inserted into an essentially U-shaped sheet metal part from the bottom, preferably in positive fashion. This cast metal part is fixed on the sheet metal part by the bent sections of the sheet metal part. These bent sections of the sheet metal part can be advantageously realized in the form of holding tabs. The upper part of the sheet metal part accommodates the collar of the cast metal which in turn accommodates the fastening nut and collar formed in integral therewith. A washer can extend through a corresponding aperture in the rear part of the sheet metal part and project beyond the upper side of the sheet metal part. The fastening nut and, if so required, the washer, can be laterally inserted underneath the collar of the cast metal part. The region in which the fastening nut is inserted is blocked by a securing element.

The collar is open in a direction approximately perpendicular to the longitudinal axis of the mounting part. The aperture in the rear part as well as the upper part of the cast metal part which extends through this aperture essentially have a corresponding rectangular shape or contour. The longitudinal sides of the aperture and the upper part of the cast metal part extend parallel to the longitudinal axis of the mounting part. The collar of the fastening nut and, if so required, the washer which are inserted into the collar-shaped receptacle protrude beyond the recess in the radial direction at their longitudinal sides. In the regions in which the collar of the fastening nut radially protrudes beyond the aperture, the fastening nut presses against the upper side of the sheet metal part with its collar during the mounting of the wiper arm on the drive shaft and while the wiper arm is mounted on the drive shaft. Consequently, the pressing forces exerted by the fastening nut upon the cast metal part in the sheet metal part are distributed. Consequently, the connection between the sheet metal part and the cast metal part remains intact. The region in which the fastening nut is inserted is again blocked by a securing element.

The cast metal part can be attached to the sheet metal part with a groove on its face side and fixed on the sheet metal part by means of bent sections of the sheet metal part that, in particular, are realized in the form of holding tabs.

The cast metal part can be attached to the rear part of the sheet metal part from the top, with the lower part of the cast metal part extending through an aperture in the rear part of the sheet metal part. The cast metal part is riveted, caulked or screwed to the sheet metal part. For this purpose, rivet pins that extend through corresponding bores in the sheet metal part and are riveted or caulked on the underside of the rear part can be integrally formed onto the underside of the cast metal part. However, the utilization of separate rivets or screws would also be conceivable.

Alternative embodiments include a wiper arm with a mounting part which consists of a sheet metal part with an essentially U-shaped cross section.

The fastening nut is located in a mounting position on the rear part of the sheet metal part. Several fastening sections that are distributed over the circumference protrude upward from the rear part adjacent to the edge of the collar of the fastening nut and overlap the edge of the collar of the fastening nut. The free ends of these fastening sections are bent radially inward over the edge of the collar after the fastening nut and, if so required, the washer are properly positioned. The fastening sections act as limit stops that are connected to the mounting part. If this wiper arm is provided with a layer of enamel, the enameling is preferably carried out after the fastening nut is attached to the mounting part, i.e., after the fastening sections have been bent.

The fastening sections can be advantageously formed out of the rear part of the sheet metal part. For this purpose, the fastening sections are respectively punched or cut out of the rear part in such a way that each tab-shaped fastening section is only connected to the sheet metal part on one side. Subsequently, the individual tab-shaped fastening sections are bent upward, with their free ends subsequently being bent radially inward over the collar of the fastening nut.

Alternatively, no fastening section that is bent out of the rear part of the sheet metal part is located on one side of the rotational axis of the fastening nut. As a result, a region is formed for laterally inserting the fastening nut and, if so required, the washer. The remaining fastening sections are bent radially inward at their free ends before attaching the fastening nut to the mounting part, in such a way that the fastening nut can be laterally pulled into its mounting position through the insertion region. In this case, the collar of the fastening nut is positioned underneath the bent ends of the fastening sections. The insertion region is again blocked by a securing element. The fastening sections act as limit stops that are connected to the mounting part. If the wiper arm must be enameled, the enameling should be carried out before the fastening nut and, if so required, the washer are attached to the mounting part. In this case, the fastening nut and, if so required, the washer can also be enameled before the mounting process.

Also disclosed are different embodiments of securing elements for wiper. The securing element blocks an insertion region after laterally inserting the fastening nut and, if so required, the washer underneath limit stops that are connected to the mounting part.

One such securing element is a stopper-like plastic part with catch elements. After laterally inserting the fastening nut into a corresponding recess or a corresponding aperture, this plastic part is snapped into the insertion region.

The securing element is connected to a covering cap for the fastening region in articulated fashion. The securing element is situated and fastened on the mounting part in such a way that the fastening nut is unable to slide out. The wiper arm is delivered with the covering cap in the open position such that a tool can be directly attached to the fastening nut. After mounting the wiper arm, the covering cap is pivoted over the fastening nut or the entire fastening region and, for example, snapped onto the mounting part.

The securing element can be a hinge bolt, by means of which a covering cap is coupled to the mounting part in articulated fashion. The hinge bolt is arranged in flush bores in the mounting part or in the collar that accommodates the collar of the fastening nut. The bores are arranged in such a way that the hinge bolt arranged therein prevents the fastening nut from sliding out, i.e., the insertion region is blocked by a securing element in the form of a hinge bolt.

The securing element can be, instead of one continuous hinge bolt, formed by two hinge pins that are integrally formed onto a covering cap. The covering cap is coupled to the mounting part in such a way that the hinge pins extend from the outside through the flush bores in the mounting part or in the collar for accommodating the collar of the fastening nut and consequently block the insertion region.

A special formed part that preferably is manufactured of plastic is used as the securing element. This formed plastic part is designed in such a way that it can be snapped onto the mounting part and consequently block the insertion region. In addition, the formed part is preferably designed such that it essentially covers the fastening region of the mounting part and supplements the shape of the mounting part so as to form a harmonious unit.

The fastening nut comprises a cylindrical shaft between the collar and the part for attaching an appropriate wrench. The diameter of this cylindrical shaft is smaller than the diameter of the collar, but larger than the width of the part for attaching the wrench. The part for attaching the wrench may be in the form of a hex-head wrench. It is particularly advantageous if the cylindrical shaft protrudes at least slightly beyond the limit stops that cooperate with the collar of the fastening nut or beyond the underside of the rear part of the mounting part, from which the upper part of the fastening nut projects. In this case, the lower edge of the wrench can be placed on the cylindrical shaft such that it assumes a defined position. If the height of the shaft is realized in the previously described fashion, the wrench will not come into contact with the limit stops or the upper side of the mounting part and scratch their respective surfaces or a layer of enamel applied thereon.

Also disclosed is an additional simplification of the mounting of the wiper arm on the drive shaft. This simplification consists of an improved or simpler centering of either the fastening nut that is screwed onto the threaded projection on the free end of the drive shaft or the opening of the mounting part that, particularly, is realized in the form of an inner cone relative to the free end of the drive shaft.

The underside of the fastening nut which adjoins the mounting part or the washer that adjoins the mounting part comprises a short cylindrical bore section that is unthreaded and located before the threads of the fastening nut begin. The diameter of this short bore section is slightly larger than the diameter of the interior thread of the fastening nut and consequently also slightly larger than the outer diameter of the threaded projection on the free end of the drive shaft. When mounting the wiper arm on the drive shaft, the threaded projection of the drive shaft, after having been inserted into the opening in the mounting part, can be automatically inserted into the short cylindrical bore section of the fastening nut without requiring additional manipulations such that the fastening nut is centered relative to the threaded projection. At this point, the fastening nut need only be tightened on the threaded projection with the aid of a wrench.

The mounting part comprises a short cylindrical bore section adjacent to the conically tapered side of the opening for mounting the wiper arm on the drive shaft. This bore section which has a slightly larger diameter than the outer diameter of the threaded projection of the drive shaft causes the centering of the mounting part and the fastening nut held thereon in captive fashion relative to the drive shaft when the wiper arm is mounted to the free end of the drive shaft. This measure also simplifies the mounting of the wiper arm on the drive shaft.

The underside of the mounting part is provided with an axial, hollow-cylindrical extension that is arranged coaxially to the opening of the mounting part. Consequently, the bottom of this hollow-cylindrical extension adjoins the widened side of the conical opening of the mounting part. The inner diameter of this hollow-cylindrical extension essentially corresponds to the diameter of the drive shaft, i.e., the extension is able to support itself on the drive shaft with its inner surface. This particular measure serves for aligning the mounting part relative to the drive shaft. In addition, the stability of the connection between the mounting part and the drive shaft is improved due to the enlarged region of the positive fit.

A second hollow-cylindrical extension is arranged axially adjacent to the first hollow-cylindrical extension according to claim 38. This second hollow-cylindrical extension, the inner diameter of which is larger than that of the first-mentioned hollow-cylindrical extension, essentially is provided for covering parts of the wiper bearings of the drive shaft which might project from the motor vehicle chassis. Due to this measure, the wiper bearings are protected from dirt and humidity, and a more attractive appearance of the entire arrangement is attained.

Additional advantageous embodiments of the fastening nut are also disclosed.

The fastening nut is not provided with a circumferential collar. This collar is replaced with a perforated disk that is correspondingly stable and arranged on the fastening nut in such a way that it is able to transmit the pull-off forces onto the mounting part via the limit stops. In this case, the perforated disk can, depending on the geometric ratios of the mounting part or the forces to be transmitted, be realized in plane or profiled fashion.

The perforated disk can be rigidly attached to the fastening nut. In contrast to this embodiment, the perforated disk can instead be arranged such that it can be turned relative to the fastening nut in the circumferential direction but is fixed in the axial direction.

A fastening screw be used as the fastening element instead of a fastening nut. In this case, the fastening screw axially engages into the interior threads arranged in the face side of the drive shaft. This fastening screw is held in captive fashion on the mounting part analogously to a fastening nut, in the approximate mounting position. The shaft of the fastening screw is arranged in the opening of the mounting part that serves for mounting the wiper arm on the drive shaft, with the underside of the screw head adjoining the mounting part or a washer arranged between the screw head and the mounting part. The lower edge of the screw head is provided with a radially extending circumferential collar or a perforated disk that is realized in plain or profiled fashion and fastened to the screw head. Limit stops that overlap the collar or the perforated disk or are arranged above these components are arranged on the mounting part. When unscrewing the screw from the drive shaft, the collar or the perforated disk are effectively connected to the limit stops such that the wiper arm is pulled off the drive shaft.

The fastening screw comprises a unthreaded cylindrical region at its end that is situated opposite to the screw head in order to center the fastening screw on the end of the drive shaft. The diameter of this cylindrical region is slightly smaller than the interior threads arranged in the face side of the end of the drive shaft.

BRIEF DESCRIPTION OF THE DRAWING

FIG. 13 is a different variant of a wiper arm according to the invention.

FIGS. 14–18, excepting FIG. 14a, are additional embodiments or variants of a wiper arm according to the invention, in the form of sections along a plane that extends through the geometric axis of the opening in the mounting part and perpendicular to the central longitudinal axis of the mounting part.

FIG. 14a is a perforated disk according to FIG. 14 and 15 in the form of a perspective representation.

DETAILED DESCRIPTION OF PREFERRED EMBODIMENTS

Figure 1:
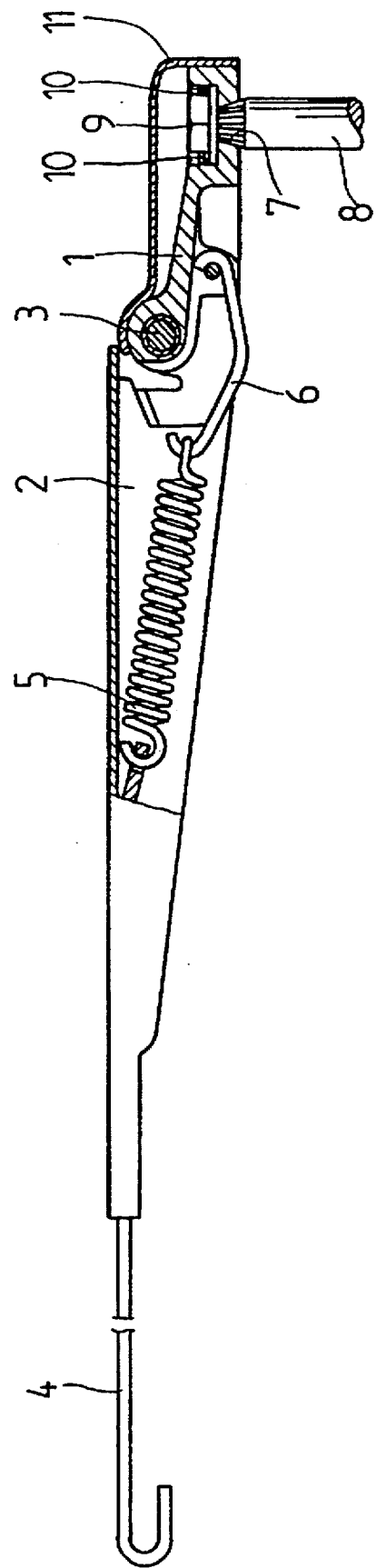
FIG. 1 is a partially sectioned representation of a wiper arm for motor vehicles.

FIG. 1 shows a wiper arm according to the invention in the form of a partial cross-sectional representation. The wiper arm includes a mounting part 1, to which an articulated part 2 of essentially U-shaped cross section is coupled such that it can be pivoted about an axis 3 that extends perpendicularly to the plane of projection. A wiper rod 4 is conventionally fastened to the articulated part 2 in the form of an extension of the articulated part 2. At its free end, the wiper rod 4 can be connected to a wiper blade (not shown), the edge of which is intended for cleaning the windshield. A tension spring that acts as a pretensioned pressing spring 5 is suspended with one end on the articulated part 2 or the end of the wiper rod 4 that protrudes into the articulated part 2 and the other end on the mounting part 1 behind the axis 3 by means of a C-strap 6. The end of the mounting part 1 situated opposite to the articulated part 2 is provided with an opening 7 that serves for rigidly mounting the wiper arm on a drive shaft 8. A fastening element in the form of a fastening nut 9 is held in captive fashion on the mounting part 1 by means of limit stops 10. A covering cap 11 covers the entire mounting part 1.

Due to the reciprocating, pivotal motion of the drive shaft 8 between two end positions, the wiper arm is driven such that it also carries out reciprocating pivotal motion, i.e., the edge of the wiper blade passes over a certain area of the windshield and cleans this area.

FIGS. 1a–1e show different variations of fastening means that can be used for the wiper arm according to the invention.

Figure 1A:
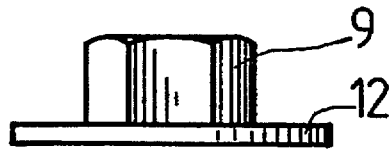
FIGS. 1a–1e are different variants of fastening elements.

FIG. 1a shows a fastening nut 9 that comprises a radially extending circumferential collar 12 on its lower edge. This collar 12 is formed integrally with the remainder of the fastening nut 9 and is intended for cooperating with limit stops 10 that are arranged above the collar and connected to the mounting part 1.

Figure 1B:
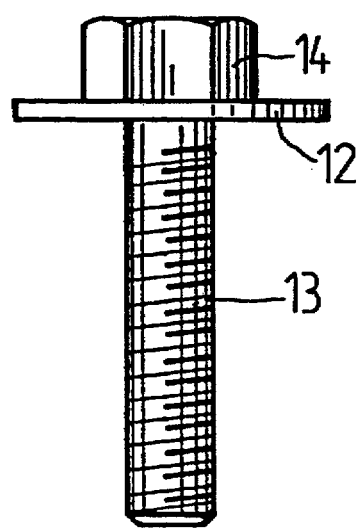

FIG. 1b shows a fastening screw 13 that includes a radially extending circumferential collar 12 on the lower edge of the screw head 14, analogous to the fastening nut 9 according to FIG. 1a. This collar fulfills the same function as the aforementioned fastening nut.

Figure 1C:
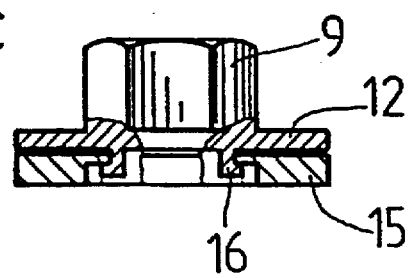

FIG. 1c shows a fastening nut 9 of the same design as in FIG. 1a. However, here a washer 15 is held on the underside of the fastening nut 9 such that it can be turned relative to the fastening nut 9 in the circumferential direction. For this purpose, an axial extension 16 of the fastening nut 9 which extends through a stepped perforation of the washer 15 is flanged outwardly at its outer edge. The flanged edge only engages behind the first step of the perforation of the washer 15. The flanged edge does not protrude from the underside of the washer 15. At least a little play exists between the underside of the fastening nut 9 and the washer 15.

Figure 1D:
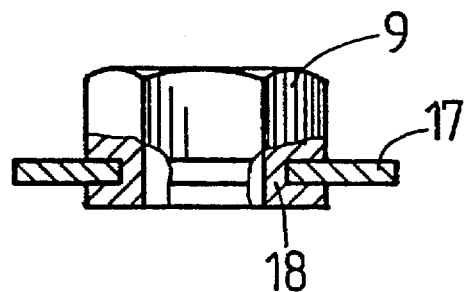

FIG. 1d shows a fastening nut 9 in which in contrast to FIG. 1a, the collar 12 is replaced with a stable perforated disk 17 that is attached to the underside of the fastening nut 9 in the form of a separate part. For this purpose, an axial extension 18 extends from the underside of the fastening nut 9 through the perforation of the perforated disk 17, with the part of the extension 18 that extends through the perforation bending around the edge of the perforation of the perforated disk 17. The underside of the bent extension 18 is planar. Depending on the respective requirements, the perforated disk 17 can be formed in planar or profiled fashion. The broken lines indicate a plate-shaped perforated disk 17, the lower edge of which approximately lies in the same plane as the underside of the extension 18. Depending on the respective requirements, the perforated disk 17 can be rigidly fastened to the fastening nut 9 or moved relative to the fastening nut in the circumferential direction.

Figure 1E:
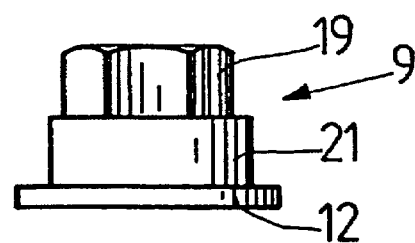

FIG. 1e shows a fastening nut 9 with a circumferential collar 12 integrally formed thereon. This fastening nut includes a cylindrical shaft 21 between the collar 12 and the part 19 for accepting a wrench 20 (see FIG. 2). The diameter of this cylindrical shaft 21 is smaller than the collar 12 but larger than the width of the part 19 for accepting the wrench. This cylindrical shaft 21 forms a support or limit stop for the wrench 20.

Figure 2:
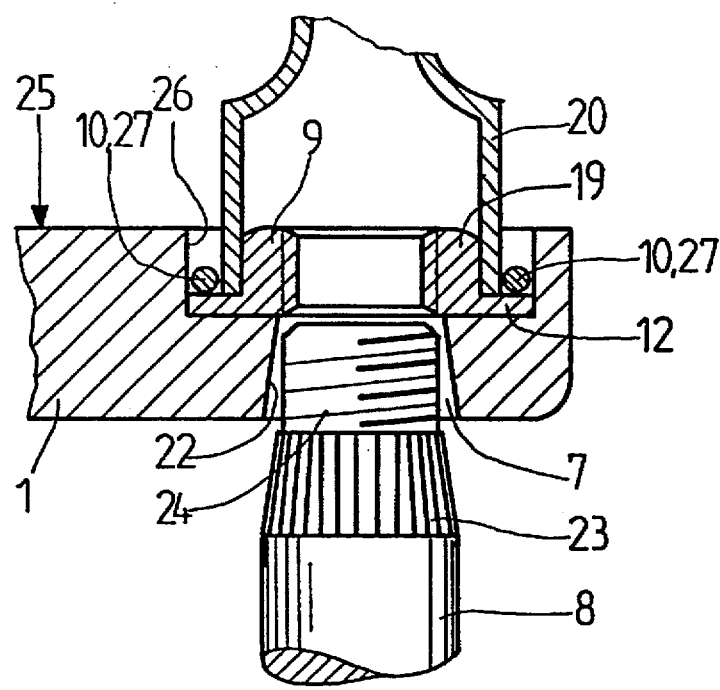
FIG. 2 is a section of a basic embodiment of a wiper arm according to the invention.
Figure 3:
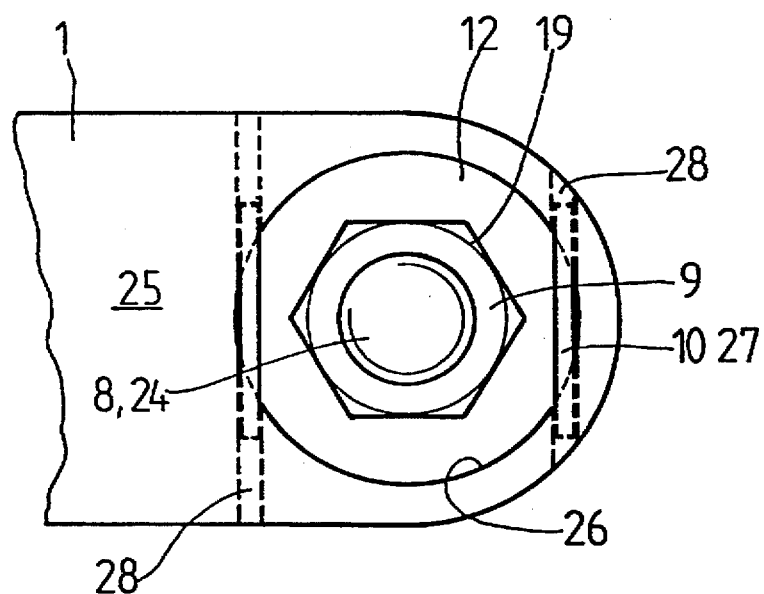
FIG. 3 is a top view of FIG. 2.

FIGS. 2 and 3 pertain to a basic variant of the solution according to the invention. However, only the important section of the mounting part 1 is illustrated in these figures. The opening 7 for attaching the mounting part 1 to the drive shaft 8 is clearly visible. This opening 7 is realized in the form of an inner cone 22, with the corresponding end region of the drive shaft 8 being formed in the form of an outer cone 23. A threaded projection 24 is arranged adjacent to the face side of the outer cone 23 of the drive shaft 8. A recess 26 with a planar base is arranged concentric to the opening 7 in the upper side 25 of the mounting part 1. This opening 7 ends in the tapered side of the inner cone 22 in the center of the recess 26. The underside of the fastening nut 9 is disposed against the base of the recess 26. The fastening nut is therefore at least approximately situated in the mounting position. When in the proper mounting position, the fastening nut 9 is situated such that it is coaxially aligned with the opening 7 and forms an axial extension of said opening. The at least approximately coaxial alignment of the fastening nut 9 is achieved since only a little play exists between the outer edge of the collar 12 of the fastening nut 9 and the walls of the recess 26. The limit stops 10 are arranged on the mounting part 1 with a small amount of play above the collar 12 of the fastening nut 9. The limit stops 10 are formed by two pins 27 of circular cross section which are inserted into correspondingly flush bores 28 (see FIG. 3) in the walls that surround the recess 26. In contrast to the arrangement shown in FIGS. 2 and 3, the bores 28 and consequently the pins 26 can also be aligned parallel to the longitudinal axis 29 of the mounting part 1.

The pins 27 in cooperation with the recess 26 hold the fastening nut 9 on the mounting part 1 in captive fashion, at least approximately in the mounting position. In addition, the pins 27 act as limit stops 10 and consequently ensure the pull-off function of the fastening nut 9. Additionally indicated is attached wrench 20, affixed to fastening nut. In FIG. 2, the mounting part 1 is illustrated in the initial mounting position on the drive shaft 8.

Figure 3A:
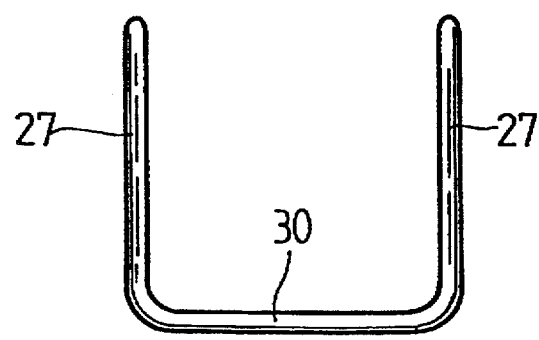
FIG. 3a is a variant of removable limit stops.

FIG. 3a shows two pins 27 that serve as limit stops 10. The pins 27 are essentially arranged parallel to one another and are connected to one another at one end by means of a connecting piece 30. The thusly formed fork-shaped limit stop part is dimensioned in such a way that it can be inserted into the flush bores 28 instead of the two separate pins 27 according to FIGS. 2 and 3. If the pins 27 slightly converge or diverge at their free ends, a certain elastic pretensioning is attained which is able to hold the fork-shaped limit stop part in the bores 28 of the fastening mounting part 1 with sufficient reliability. After mounting the wiper arm on the drive shaft 8, the fork-shaped limit stop part can simply be pulled out of the bores 28 in the mounting part 1 because it is no longer needed once the wiper arm is mounted. If it is necessary to remove the wiper arm from the drive shaft 8, the fork-shaped limit stop part is reinserted into the flush bores 28. Consequently, the limit stop part ensures the pull-off function of the fastening nut 9 and holds said fastening nut on the mounting part 1 as described above after the wiper arm has been removed from the drive shaft 8.

Figure 4:
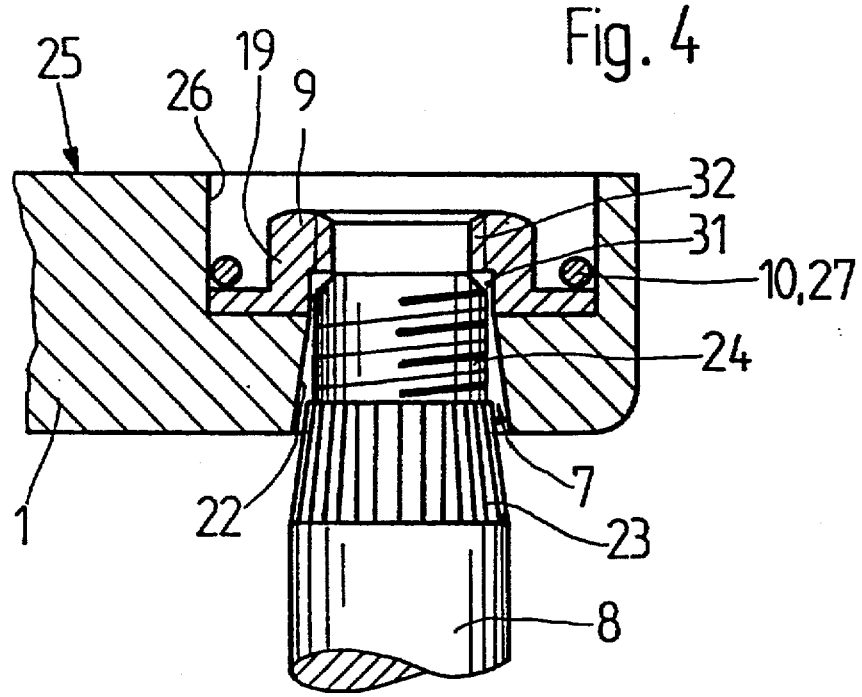
FIGS. 4–7 are advantageous embodiments of the basic variant according to FIG. 2.

The embodiment according to FIG. 4 is realized essentially identically to the one shown in FIG. 2; however, the underside of the fastening nut 9 includes a short cylindrical bore section 31 which is situated adjacent to the thread 32 of the nut. The diameter of this bore section 31 is slightly larger than the outer diameter of the threaded projection 24 of the drive shaft 8. Consequently, the mounting of the wiper arm on the drive shaft 8 is simplified due to the automatic centering of the fastening nut 9 relative to the threaded projection 24. FIG. 4 shows the position that the mounting part 1 and the fastening nut 9 assume relative to the drive shaft 8 before the fastening nut 9 is screwed onto the threaded projection 24.

Figure 5:
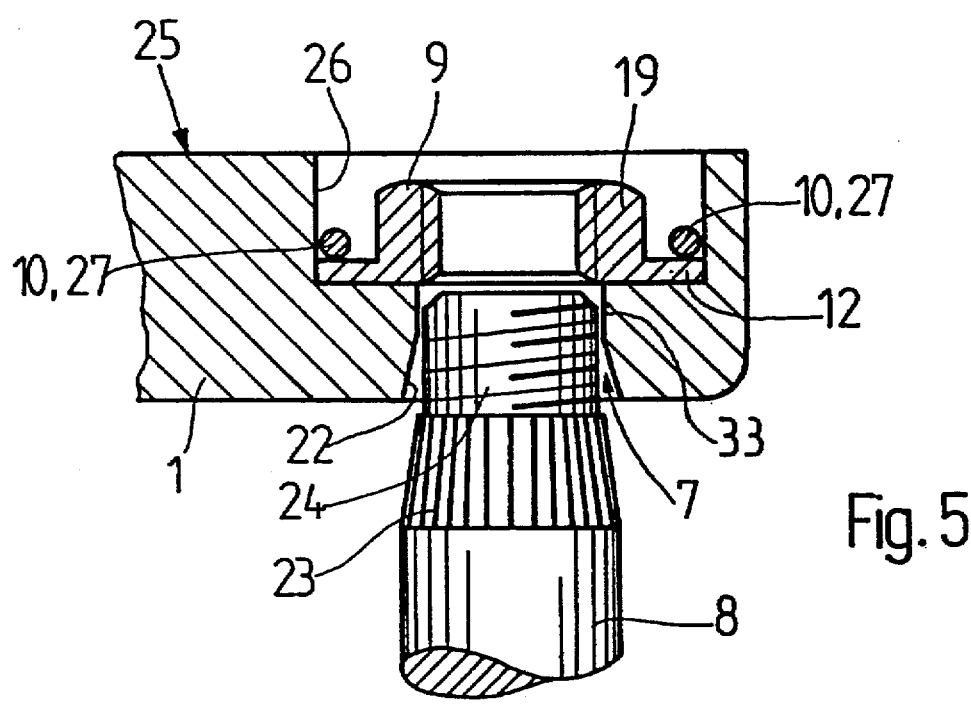

The embodiment according to FIG. 5 is also realized essentially identically to the one shown in FIG. 2. In order to simplify the mounting process, a short cylindrical bore section 33 is arranged in the opening 7 adjacent to the tapered side of the inner cone 22. This bore section 33 which has a slightly larger diameter than the outer diameter of the threaded projection 24 causes the centering of the mounting part 1 relative to the drive shaft 8 during the mounting of the wiper arm.

Figure 6:
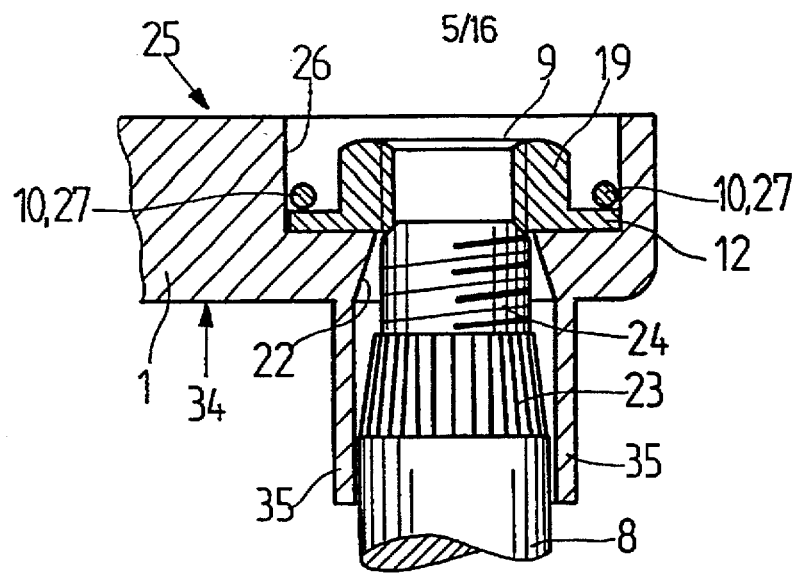

FIG. 6 shows an embodiment that is realized similar to the one shown in FIG. 2. In this case, the mounting part 1 is, however, provided with a hollow-cylindrical extension 35 on its underside 34. This extension is integrally formed on the mounting part in the form of an axial extension of the widened side of the inner cone 22. This extension 35 is dimensioned in such a way that it causes the centering of the mounting part 1 relative to the drive shaft 8 when the wiper arm is mounted. In addition, the extension 35 is able to support itself on the drive shaft 8 with its inner surface such that a tilting of the mounting part 1 on the drive shaft 8 is prevented.

Figure 7:
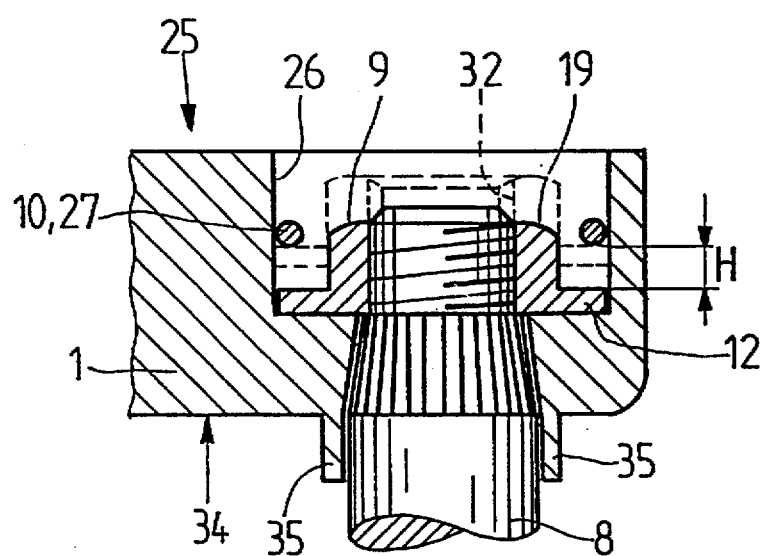

The embodiment shown in FIG. 7 essentially corresponds to the one shown in FIG. 6. In order to simplify the mounting of the wiper arm, in particular, the connection between the threads 32 of the nut and the threaded projection 24, the fastening nut 9 is able to move within a certain range in the axial direction.

For this purpose, the limit stops 10 formed by the pins 27 are arranged at an elevation H above the collar 12 of the fastening nut 9. In this case, the elevation H must be less than the depth to which the threaded projection 24 is screwed into the fastening nut. Only this measure ensures that the collar 12 of the fastening nut 9 is effectively connected to the limit stops 10 before the fastening nut 9 is completely unscrewed from the threaded projection 24 (this position of the fastening nut 9 is illustrated by broken lines in FIG. 7). A sufficiently threaded section of the threaded projection 24 is still available for pulling the fastening nut 9 off the mounting part 1 which is firmly seated on the drive shaft 8.

In the embodiments according to FIGS. 2–7, it is also possible to arrange a washer 15 between the mounting part 1 and the fastening nut 9 or to utilize a fastening nut 9 according to one of FIGS. 1c–1e.

Figure 8:
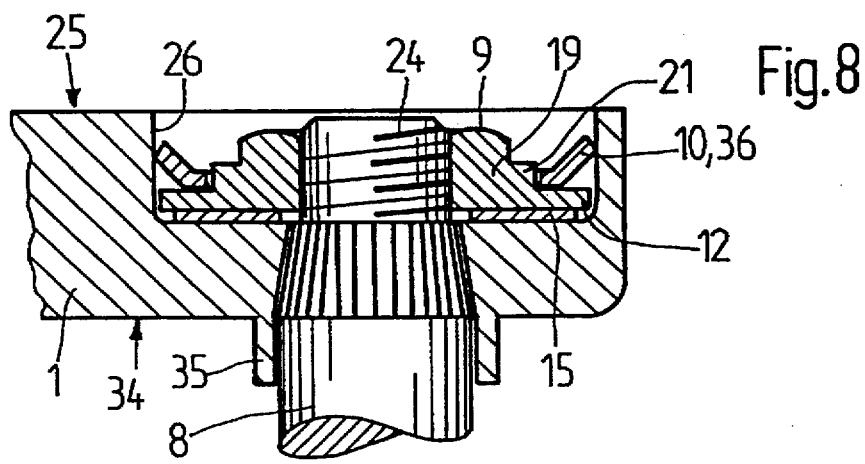
FIG. 8 is a variant for attaching the fastening nut on the mounting part by means of a clamping bridge.

FIG. 8 shows an embodiment in which the mounting part 1 is attached to the drive shaft 8. A washer 15 and a fastening nut 9 according to FIG. 1e are inserted into the recess 26 in the upper side 25 of the mounting part 1. The limit stop 10 is formed by an annular clamping bridge 36 that is fixed to the walls of the recess 26 by its outer edge above the collar 12 of the fastening nut 9, and overlaps the collar 12 of the fastening nut 9 with its inner edge. A small amount of play exists between the collar 12 and the inner edge of the clamping bridge 36. The cylindrical shaft 21 of the fastening nut 9 is situated in the perforation of the clamping bridge 36 and slightly protrudes from the upper side of this clamping bridge. Consequently, it is not possible to press against the clamping bridge 36 with an attached wrench (not shown) to affect its position. A hollow-cylindrical extension 35 that fulfills the previously described function is also situated on the underside 34 of the mounting part 1. The clamping bridge 36 is sufficiently stable and mounted in the walls of the recess 26 in sufficiently rigid fashion for ensuring the pull-off function of the fastening nut 9.

Figure 9:
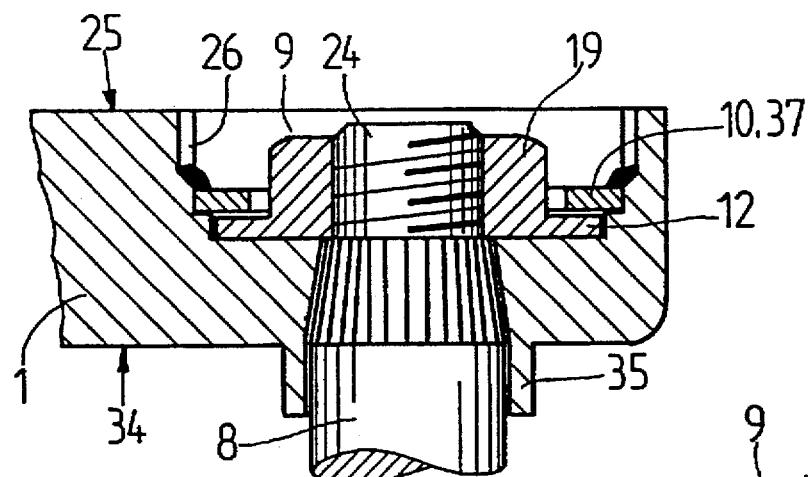
FIG. 9 is an alternative variant for attaching the fastening nut on the mounting part.
Figure 9A:
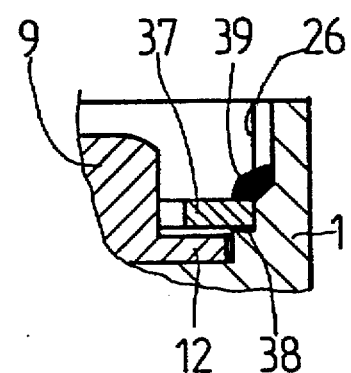
FIG. 9a is an enlarged detail of FIG. 9.
Figure 9B:
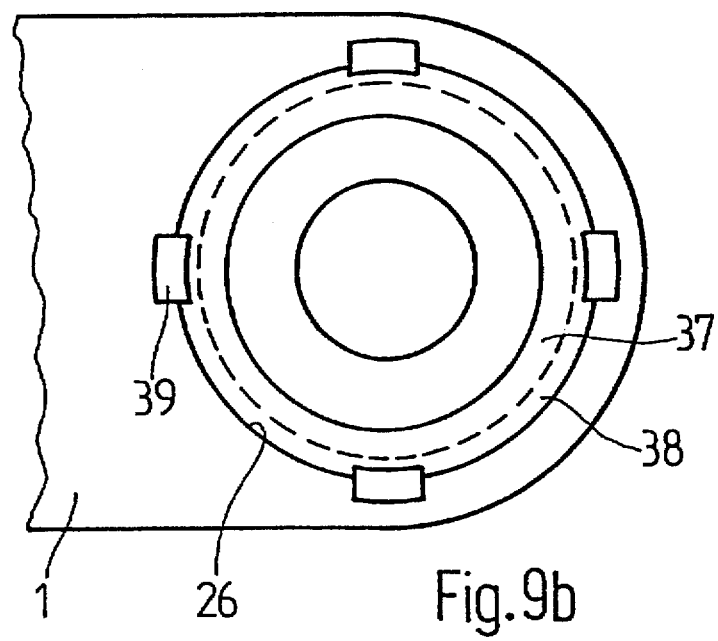
FIG. 9b is a top view of FIG. 9.

FIGS. 9, 9a and 9b show an embodiment that is realized similarly to the one shown in FIG. 8, with FIG. 9a showing an enlarged detail of FIG. 9. In this embodiment, a simple fastening nut 9 with a circumferential collar is used, i.e., a washer 15 is not provided. The limit stop 10 is formed by a perforated disk 37 that is arranged above the collar 12 of the fastening nut 9 and fixed on the walls of the recess 26. The perforated disk 37 has a circular shape and lies on a shoulder 38 situated on the bottom edge of the recess 26 with the outer part of its lower side as shown in FIG. 9a. The height of the shoulder 38 is dimensioned such that the inner part of the perforated disk 37 overlaps the collar 12 of the fastening nut 9 with a small amount of play. The outer edge of the perforated disk 37 which adjoins the walls of the recess 26 is fixed on the walls of the recess 26 by means of a material deformation 39, e.g., caulking or the like. FIG. 9b which does not show the fastening nut 9 and the drive shaft 8 indicates that the perforated disk 37 is fixed at four locations that are distributed over the circumference by means of material deformations 39. Consequently, the perforated disk 37 is sufficiently fixed for ensuring the pull-off function of the fastening nut 9.

Figure 10:
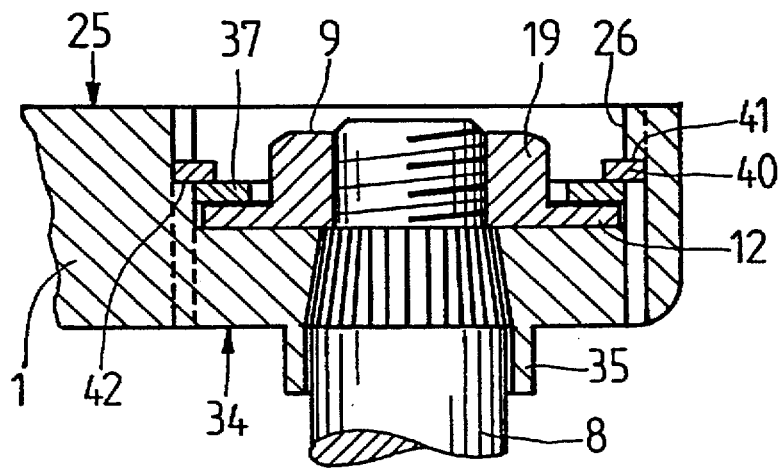
FIG. 10 is yet another alternative of the wiper arm according to the invention.

FIG. 10 shows an embodiment that is realized similarly to the one shown in FIG. 9. In contrast to FIG. 9, FIG. 10 shows a perforated disk 37 that loosely lies on the collar 12 of the fastening nut 9, with the outer edge of the perforated disk 37 loosely adjoining the walls of the recess 26. A lock washer 40 is arranged above the perforated disk 37 and fixed on the walls of the recess 26. The lock washer 40 is fixed in the axial direction by projections 41 or recesses 42 that are alternately distributed over the circumference of the walls of the recess 26.

Figure 11:
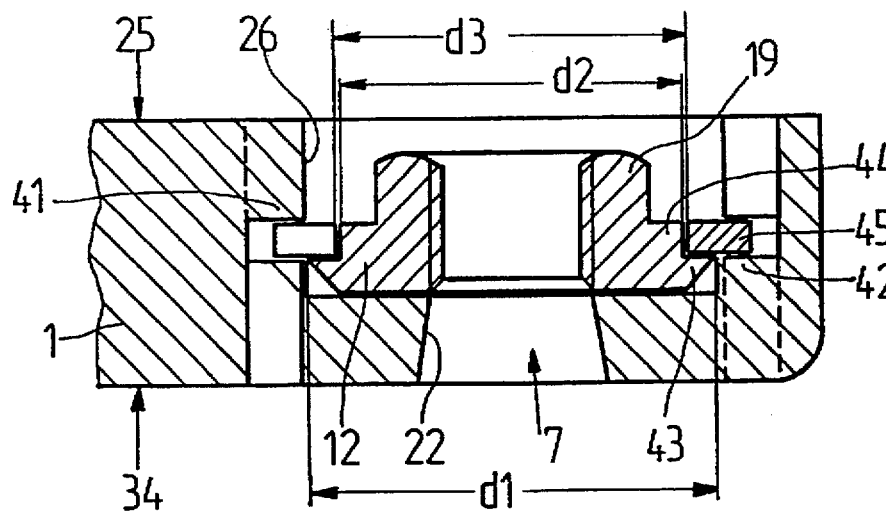
FIG. 11 is an additional variant of the wiper arm according to the invention.
Figure 11A:
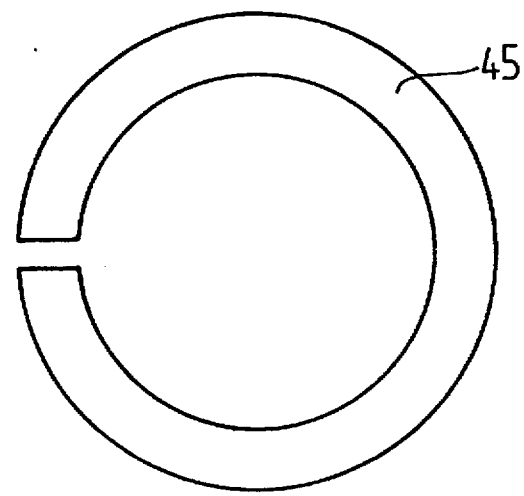
FIG. 11a is a top view of the lock washer shown in FIG. 11.

FIG. 11 shows one additional option for holding the fastening nut 9 in the recess 26 of the mounting part 1. In this case, the cylindrical collar 12 of the fastening nut 9 is realized in stepped fashion. The diameter d1 of the lower part 43 of the collar 12 is larger than the diameter d2 of the step 44 of the collar 12, and the lower part 43 of the collar conically tapers toward the bottom. At a certain elevation above the base of the recess 26, a radially split washer 45 is supported in the axial direction by projections 41 and recesses 42 that are alternately distributed over the circumference, with the split washer being held on the walls of the recess 26 such that it can move in the radial direction. The lower conical part 43 of the fastening nut 9 is pushed through the perforation of the split washer 45 while temporarily widening said split washer until the split washer 45 has reassumed its original shape and size on the step 44 of the collar. In this case, the diameter d2 of the step is slightly smaller than the diameter d3 of the perforation of the split washer 45, and the elevation of the split washer 45 above the base of the recess 26 is chosen such that the split washer 45 overlaps the lower part 43 of the collar 12 with a small amount of play. The height of the step 44 of the collar 12 is chosen such that the step 44 ends at the upper side of the split washer 45 or slightly protrudes from its upper side. A more detailed illustration of the split washer 45 is provided in FIG. 11a in the form of a top view.

Figure 12:
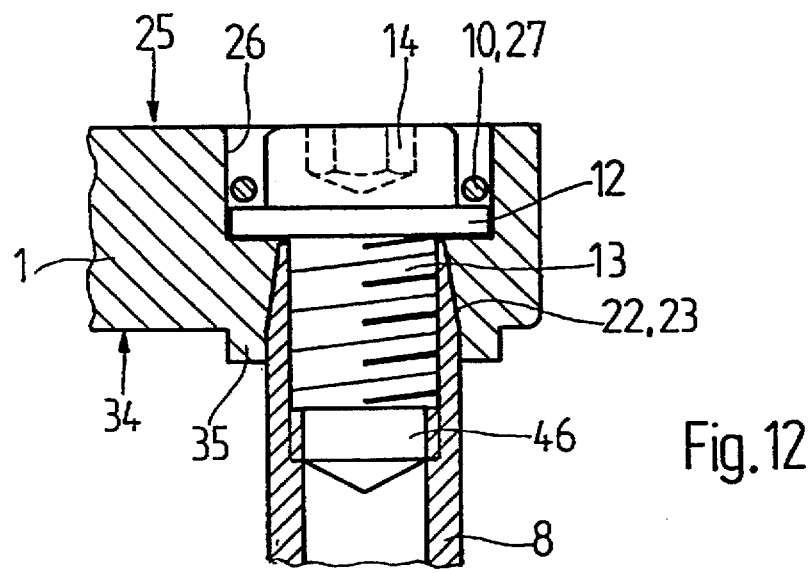
FIG. 12 is a variant of a wiper arm according to the invention with a fastening screw as the fastening element.

FIG. 12 shows an embodiment in which a fastening screw 13 is used for mounting the wiper arm on a drive shaft 8. The mounting part 1 of the wiper arm is realized in the form of a cast metal part, with a recess 26 being arranged in its upper side 25. The fastening screw 13 has a cylindrical screw head 14 that is provided with a hexagonal socket or the like for attaching a corresponding tool. A circumferential collar 12 is integrally formed onto the lower edge of the screw head 14. A short cylindrical region 46 that is unthreaded is situated on the free end of the threaded shaft of the fastening screw 13. The diameter of this cylindrical region 46 is smaller than that of the interior threads arranged in the end of the drive shaft 8 that is realized in the form of a hollow shaft in this embodiment. This cylindrical region 46 serves for centering the fastening screw 13 relative to the interior threads of the drive shaft 8 when mounting the wiper arm on the drive shaft 8. The threaded shaft of the fastening screw 13 is arranged in the inner cone 22 of the mounting part 1, with the collar 12 and the screw head 14 of said fastening screw being simultaneously arranged in the recess 26 of the mounting part 1. Two pins 27 of the type described previously with reference to FIG. 2 are arranged above the collar 12 of the fastening screw 13 and held on the mounting part 1. Consequently, the pull-off function of the fastening screw 13 is ensured. A hollow-cylindrical extension 35 that serves for centering and supporting the mounting part 1 on the drive shaft 8 is situated on the underside 34 of the mounting part 1.

FIG. 13 shows a mounting part 1 that is composed of a sheet metal part 47 and a cast metal insert 48. The sheet metal part 47 has an essentially U-shaped cross section with a rear part 49. In this case, the cross section of the sheet metal part 47 is open toward the bottom. The cast metal insert 48 is positively inserted into the sheet metal part 47 from the bottom and held thereon by means of bent regions of the sheet metal part 47 that are realized in the form of holding tabs 50. The opening 7 for mounting the wiper arm on the drive shaft 8 is arranged in the cast metal insert 48. A hollow-cylindrical extension 35 that fulfills the previously described function is also situated on 34 the underside 34 of the cast metal insert 48. A recess 51 that surrounds the opening 7 is provided on the upper side of the cast metal insert 48, with the collar 12 of the fastening nut 9 being arranged inside of said recess. An opening 52 is arranged concentrically to the opening 7 in the rear part 49 of the sheet metal part 47. The edge of this opening 52 overlaps the collar 12 of the fastening nut 9 and consequently acts as a limit stop 10, i.e., the pull-off function of the fastening nut 9 is ensured. The part 19 of the fastening nut 9 which serves for accepting a tool protrudes upwardly through the opening 52 such that a wrench can be attached at this location.

In the embodiment according to FIG. 14, the underside of the fastening nut 9 lies on the upper side 25 of the mounting part 1. In this case, the fastening nut 9 is aligned at least approximately coaxially to the opening 7 that has the inner cone 22. A perforated disk 53, a perspective representation of which is shown in FIG. 14a, is arranged above the collar 12 of the fastening nut 9 in such a way that it radially overlaps the collar 12. The perforated disk 53 comprises two fastening sections 54 that are integrally formed on its outer edge at opposite locations. The fastening sections 54 extend axially downward along the side walls 56 of the mounting part 1, with the ends 55 of the fastening sections 54 bending inwardly in such a way that they engage beneath the underside of the mounting part 1. FIG. 14 shows that recesses are arranged in the side walls 56 and in the lower edges of the mounting part 1, with the fastening sections 54 either extending in said recesses or their ends 55 being arranged in said recesses. Consequently, the perforated disk 53 is fixed on the mounting part 1 so rigidly that the pull-off function of the fastening nut 9 is ensured. The part 19 of the fastening nut 9 for attaching a tool projects upwardly through the perforation of the perforated disk 53 such that a wrench can be attached at this location.

The embodiment shown in FIG. 15 essentially corresponds to the one shown in FIG. 14. However, the mounting part 1 is realized in the form of a sheet metal part in this case. The fastening nut 9 lies on the upper side 25 of the mounting part 1. The perforated disk 53 is arranged on the collar 12 of the fastening nut 9 and radially overlaps the fastening nut. The two fastening sections 54 of the perforated disk 53 extend axially downward along the side walls 56 of the mounting part 1. The ends 55 of the perforated disk 53 bend inwardly and engage underneath the edge of the side walls 56, with a recess into which the end 55 of the fastening sections 54 engage being provided at the lower edge of the side wall 56. The perforated disk 53 acts as a limit stop 10 for the fastening nut 9, i.e., the pull-off function of the fastening nut 9 is ensured. The part 19 of the fastening nut 9 for attaching a tool protrudes upwardly through the perforation of the perforated disk 53.

FIG. 16 shows a mounting part 1 that is also realized in the form of a sheet metal part. The fastening nut 9 is arranged on the rear part 49, i.e., the underside 25 of the mounting part 1, such that it is situated coaxial to the opening 7. The perforated disk 53 arranged above the collar 12 of the fastening nut 9 radially overlaps the collar 12. The fastening sections 54 of the perforated disk 53 extend through corresponding openings in the rear part 49 of the mounting part 1, and its outwardly bent sections 55 respectively engage underneath the lower edge of a side wall 56 of the mounting part 51 and engage into a corresponding recess arranged on the lower edge of the side wall 56. Consequently, the attachment of the fastening nut 9 and its pull-off function are ensured.

The embodiment according to FIG. 17 differs from the one shown in FIG. 16 in that the ends 55 of the fastening sections 54 of the perforated disk 53 do not engage underneath the side wall 56 of the mounting part 1, but rather a projection 57 protrudes inwardly from the side wall 56. This projection 57 is formed by a section of the side wall 56 of the sheet metal part which is separated from the sheet metal part on three sides and then bends inwardly at a right angle. It is advantageous if the upper side of the projection 57 extends transversely and downward as shown in FIG. 17. Consequently, the end 55 can be moved inwardly due to the slanted surface thereby formed during the attachment of the perforated disk 53, with the fastening section 54 engaging behind the projection 57 with its end 55 after it has been moved past the projection 57.

FIG. 18 shows a mounting part 1 that is realized in the form of a cast metal part. In this case, the fastening nut 9 is also arranged on the upper side 25 of the mounting part 1, with the perforated disk 53 being arranged above the collar 12 of the fastening nut 9 such that it overlaps said collar. One respective channel 58 for each fastening section 54 of the perforated disk 53 is arranged in the upper side 25 of the mounting part 1. The channel 58 extends axially downward and then opens toward the outside such that a projection 59 is formed. The fastening section 54 of the perforated disk 53 extends through the channel 58, with the outwardly bent end 55 of the fastening section 54 engaging beneath the limit stop 59. Consequently, the attachment of the fastening nut 9 and its pull-off function are ensured.

The embodiments shown in FIGS. 14–18 indicate that the ends 55 of the fastening sections 54 can be relatively short. In these embodiments, it is practical to realize the fastening sections 54 in springlike fashion. In addition, the ends 55 of the fastening sections 54 and the parts or projections behind which the aforementioned ends engage should be provided with correspondingly slanted surfaces. Due to this measure, the attachment of the fastening nut 9 on the mounting part 1 is significantly simplified. The fastening nut 9 need only be placed on the upper side 25 of the mounting part 1, with the perforated disk 53 being attached axially to the mounting part 1 until the ends 55 of the fastening sections 54 engage behind the corresponding sections of the mounting part 1. The subsequent bending of the ends 55 of the fastening sections 54 is not required in this case.

Figure 19:
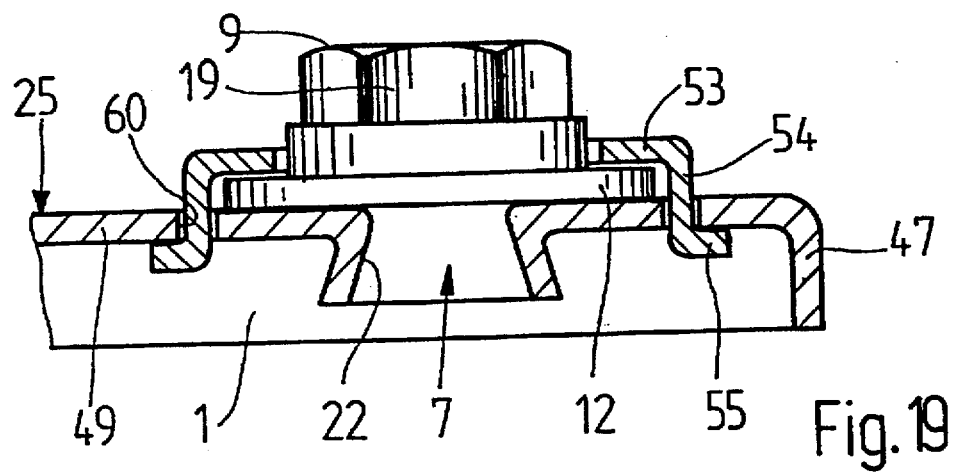
FIGS. 19–20 are different embodiments or variant of a wiper arm according to the invention.

FIG. 19 shows a mounting part 1 that is realized in the form of a sheet metal part 47. The fastening nut 9 used in this embodiment corresponds to the one used in FIG. 1e. The fastening nut 9 is arranged on the upper side 25 of the rear part 45 such that it is situated concentrically to the opening 7 that is formed in the form of an inner cone 22. A perforated disk 53, according to FIG. 14a, is fastened on the sheet metal part 47 such that it radially overlaps the collar 12 of the fastening nut 9. The attachment is realized by means of the fastening sections 54 of the perforated disk 53. In order to attain a uniform distribution of the pull-off forces, it is advantageous if the perforated disk 53 is provided with four fastening sections 54 that are uniformly distributed over its circumference. Each fastening section 54 protrudes through an opening 60 in the rear part 49 of the sheet metal part 47, with the openings 60 being arranged in the rear part 49 adjacent to the collar 12 of the fastening nut 9. The ends 55 of the fastening sections 54 are bent radially outward and engage beneath the underside of the rear part 49. Consequently, the fastening nut 9 is held in captive fashion on the mounting part 1 in the approximate mounting position, with its pull-off function ensured. The cylindrical shaft 21 of the fastening nut 9 is essentially arranged inside the perforation of the perforated disk 53 and slightly protrudes from the upper side of the perforated disk 53. The part 19 of the fastening nut 9 is freely accessible for accepting a wrench above the perforated disk 53. The cylindrical shaft 21 prevents the wrench from damaging the perforated disk 53. In addition, the gap between the cylindrical shaft 21 and the edge of the perforation in the perforated disk 53 can be very small.

Figure 20:
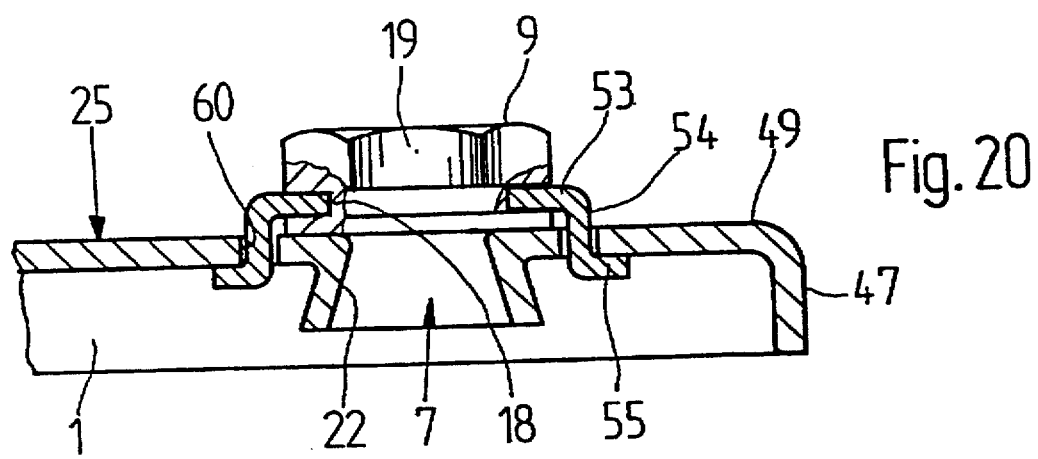
Figure 20A:
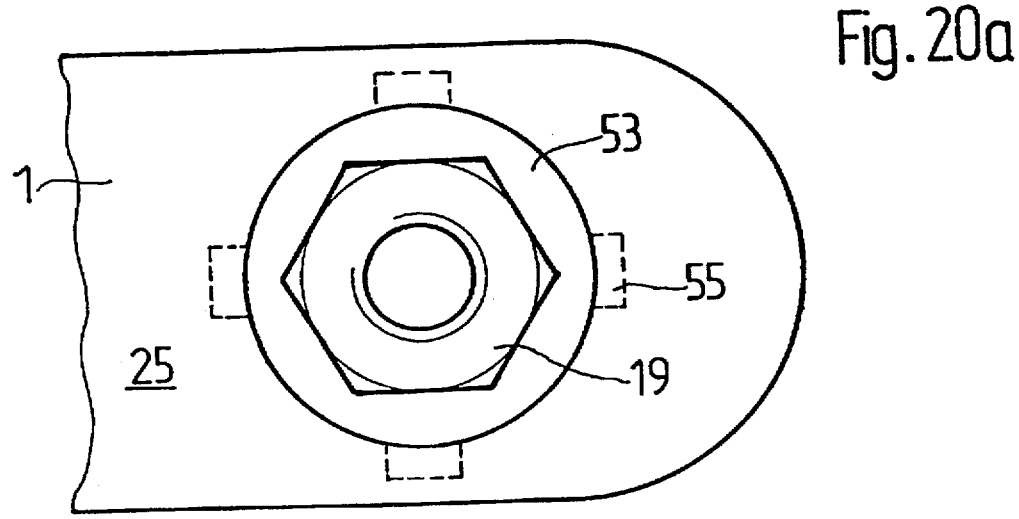
FIG. 20a is a top view of FIG. 20.

The embodiment according to FIGS. 20 and 20a essentially differs from the one shown in FIG. 19 due to the fact that a fastening nut 9 according to FIG. 1d is used. In this case, the perforated disk 53 is directly attached to the fastening nut. As compared to the embodiment according to FIG. 19, the embodiment according to FIG. 20 provides the advantage of a simplified handling of the fastening nut 9 during its attachment to the mounting part 1. In addition, this embodiment can also be used for significantly narrower wiper arms because the perforated disk 53 projects from the underside 25 of the mounting part 1 by a significantly shorter distance.

Figure 21:
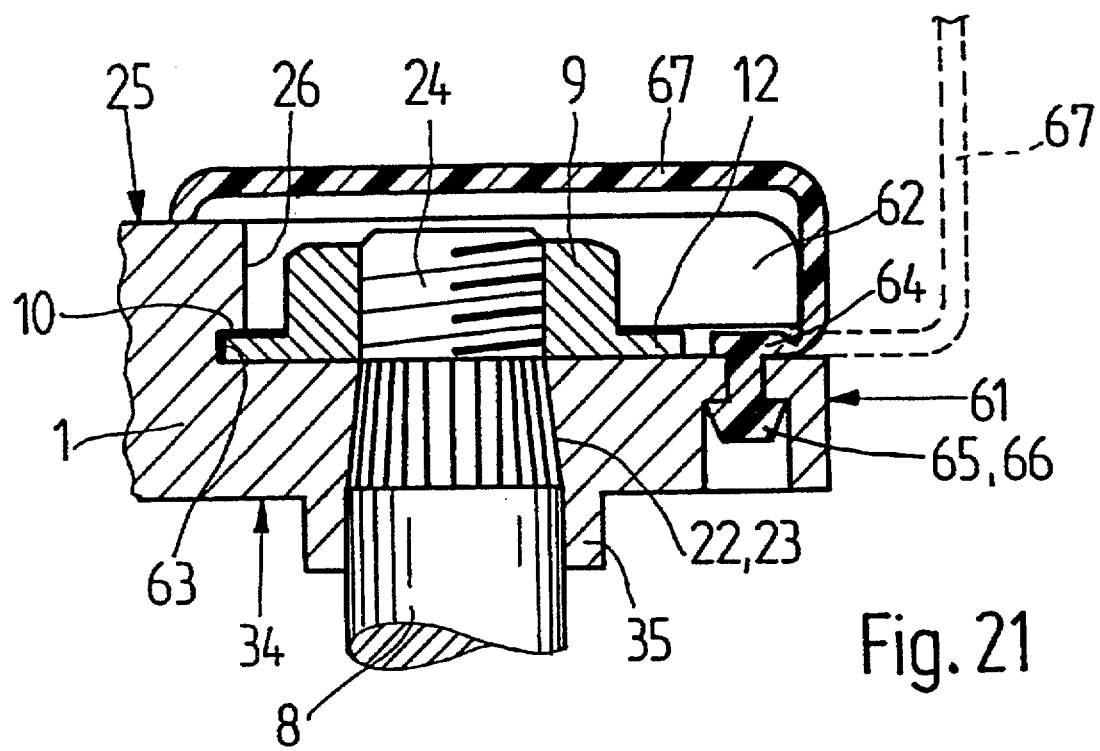
FIGS. 21–24a are additional embodiments of a wiper arm according to the invention with a cast metal mounting part.
Figure 21A:
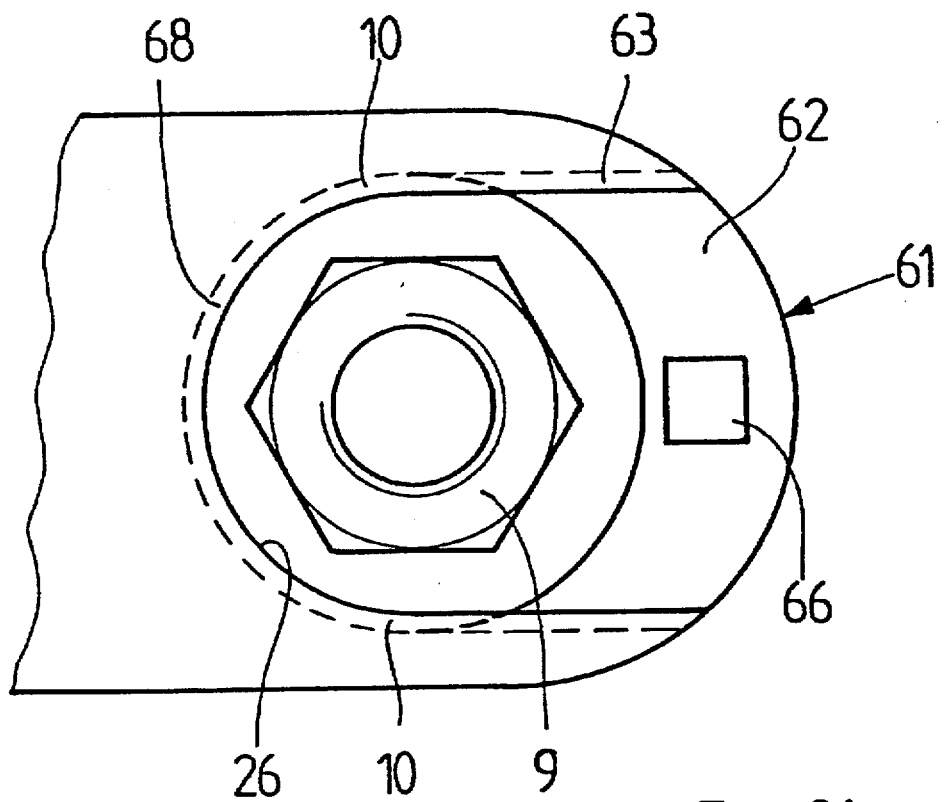

Another basic embodiment of the invention is shown in FIGS. 21 and 21a. In this case, the mounting part 1 is realized in the form of a cast metal part. The recess 26 is arranged in the upper side 25 of the mounting part 1. The recess 26 is open over its entire width in the direction toward the end 61 of the mounting part 1, with the end 61 being situated opposite to the articulated part 2 or the wiper rod 4. Due to this laterally open recess 26, a region 62 for inserting the fastening nut 9 is formed. A groove 63 is arranged in the walls of the recess 26, with said recess partially accommodating the collar 12 of the fastening nut 9 and partially overlapping the collar 12 with its upper side. The fastening nut 9 is laterally inserted into the recess 26 through the insertion region 62 until it is at least approximately situated in the mounting position. In this case, the collar 12 of the fastening nut 9 is situated in the groove 63, with the upper edge of the groove 63 overlapping the collar 12 and consequently acting as a limit stop 10. In order to prevent the fastening nut 9 from sliding out of the recess 26, the insertion region 62 is blocked by a securing element 64 after the fastening nut 9 has been inserted. The securing element 64 is realized in the form of a formed plastic part that is snapped into an opening 66 that is provided with an undercut and arranged inside of the insertion region 62 with a snap-on projection 65. FIG. 21 shows that a covering cap 67 can be coupled to the securing element 64 in pivoted fashion. In this case, the securing element 64 forms part of the covering cap 67. It is advantageous that the wiper arm be delivered with the covering cap 67 in the open position as indicated in FIG. 21 by the position of the covering cap 67 which is illustrated by broken lines. The covering cap 67 is pivoted over the recess 26 of the mounting part 1 after the wiper arm has been mounted on the drive shaft 8 and held in the closed position, (continuous lines), by means of generally known snap elements that are not illustrated in the figures. The underside 34 of the mounting part 1 is provided with a hollow-cylindrical extension 35 that causes the centering of the mounting part 1 on the drive shaft 8 and consequently the exact alignment of the wiper arm relative to the windshield to be cleaned.

In FIG. 21a, a region 68 of the groove 63 which is situated opposite to the insertion region 62 is illustrated by broken lines. The illustration in broken lines indicates that the groove 63 arranged within this region 68 is not absolutely necessary. The remaining regions of the groove 63 are able to form a sufficiently stable limit stop 10 for ensuring the pull-off function of the fastening nut 9. A simple, formed plastic part is snapped into an opening 66 as the securing element 64, with a covering cap 67 not being provided in this figure.

Figure 22:
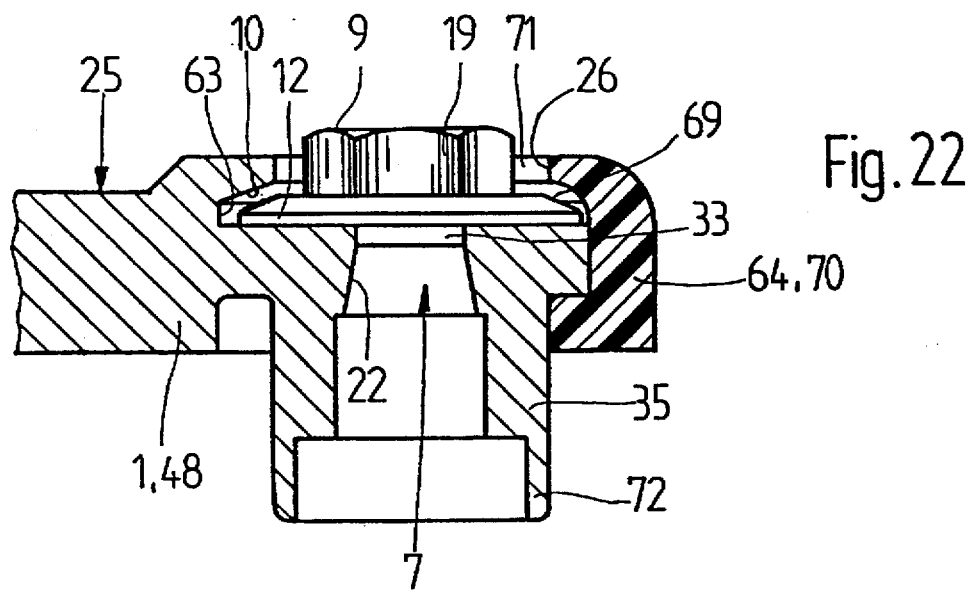
Figure 22A:
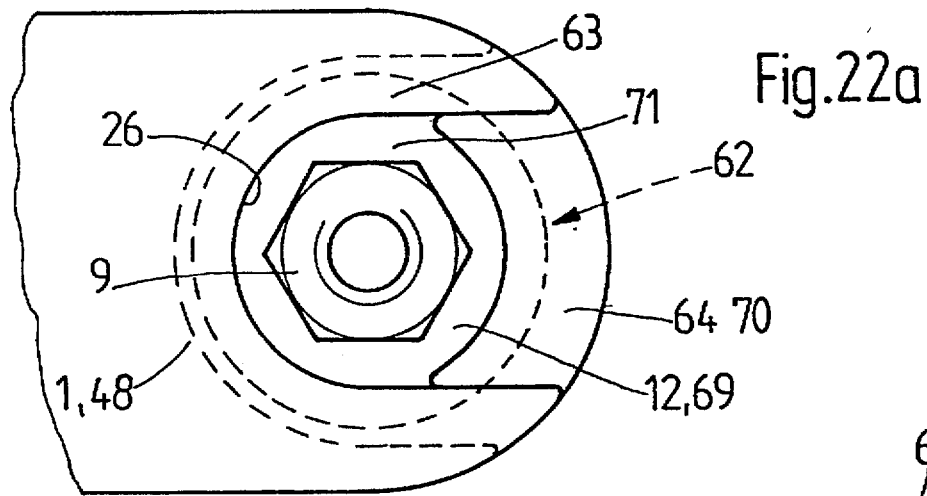

FIGS. 22 and 22a show an embodiment that is similar to the one shown in FIGS. 21 and 21a. The section of the mounting part 1 shown in these figures is part of a mounting part 1 that is entirely manufactured of cast metal or realized in the form of a cast metal insert 48 that is connected to a sheet metal part 47 of the previously described type. As in FIG. 21, the fastening nut 9 is laterally inserted into the recess 26 through an insertion region 62, with part of the collar 12 of the fastening nut 9 being situated in the groove 63 arranged in the walls of the recess 26. Since the collar 12 of the fastening nut 9 is provided with a flat bevel 69 on its upper side in this particular embodiment, the groove 63 must also have a corresponding shape. A special formed part 70 of plastic is provided as the securing element 64 for blocking the insertion region 62. This formed part 70, which entirely fills out the insertion region 62, is snapped onto the mounting part 1 in the direction in which the fastening nut 9 is inserted. This formed part has such a shape that it supplements the outer contour of the mounting part 1 and a harmonious unit is formed. The part 19 of the fastening nut 9 for attaching a tool is essentially arranged in the recess 26, with a small portion of this part 19 protruding from the upper side 25 of the mounting part 1. A circumferential gap 71 exists between the part 19 of the fastening nut 9 and the walls of the recess 26 or the formed part 70. This gap has such a width that a wrench can be properly attached to the part 19 of the fastening nut 9. The opening 7 is provided with a short bore section 33 on the tapered side of the inner cone 22 in order to center the mounting part. A hollow-cylindrical extension 35 is situated adjacent to the widened side of the inner cone 22, with said extension being able to support itself on the drive shaft 8 with its inner surface, consequently centering the mounting part 1. A second hollow-cylindrical extension 72 is situated adjacent to this first hollow-cylindrical extension 35 in the axial direction, with the inner diameter of the second hollow-cylindrical extension being greater than the inner diameter of the first hollow-cylindrical extension 35. The second hollow-cylindrical extension 72 is realized in such a way that it is able to cover bearing parts of the drive shaft 8 which might protrude from the motor vehicle chassis. Consequently, a pleasing appearance is attained and the covered parts are also protected from environmental influences to a certain degree. The limit stop 10 for ensuring the pull-off function of the fastening nut 9 is formed by the upper side of the groove 63 arranged in the walls of the recess 26.

Figure 23:
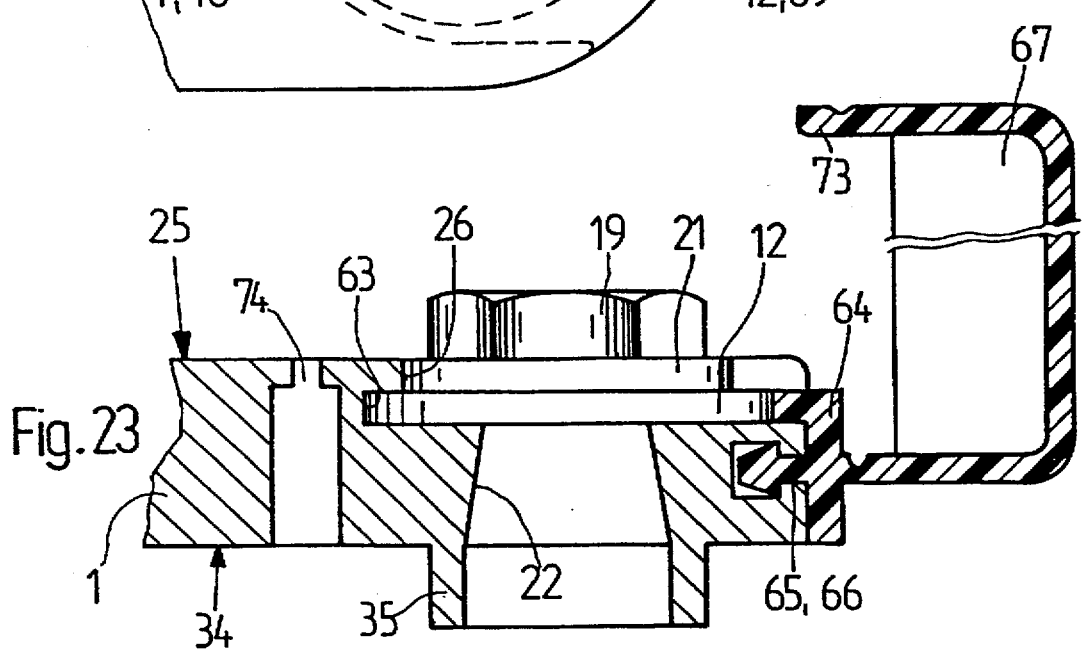

The embodiment according to FIG. 23 is realized similarly to the one shown in FIG. 21. The fastening nut 9 is laterally inserted into the recess 26, with the collar 12 of the fastening nut 9 being situated in the groove 63, and with the upper side of said groove which acts as the limit stop 10 overlapping the aforementioned collar. The insertion region 62 is blocked by a specially designed securing element 64. The securing element 64 is attached to the mounting part 1 with a snap-on projection 65 that extends through an opening 66 that is provided with an undercut and arranged in the side wall of the mounting part 1. In this case, the securing element 64 is shaped in such a way that it partially protrudes into the insertion region 62 and almost adjoins the outer edge of the collar 12 of the fastening nut 9. As in FIG. 21, a covering cap 67 is also connected in pivoted fashion to the securing element 64 in this embodiment. After mounting the wiper arm on the drive shaft 8, the covering cap 67 is pivoted over the recess 26 that contains the fastening nut 9 and is snapped into the underside 25 of the mounting part 1 with the snap-on tab 73 into the opening 74 that is provided with an undercut. The fastening nut 9 comprises a cylindrical shaft 21 that slightly protrudes from the recess 26. The part 19 of the fastening nut 9 for attaching a tool is freely accessible with a wrench. The gap between the cylindrical shaft 21 of the fastening nut 9 and the walls of the recess 26 can be quite small. A hollow-cylindrical extension 35 for centering and supporting the mounting part 1 on the drive shaft 8 is provided on the underside 34 of the mounting part.

Figure 24:
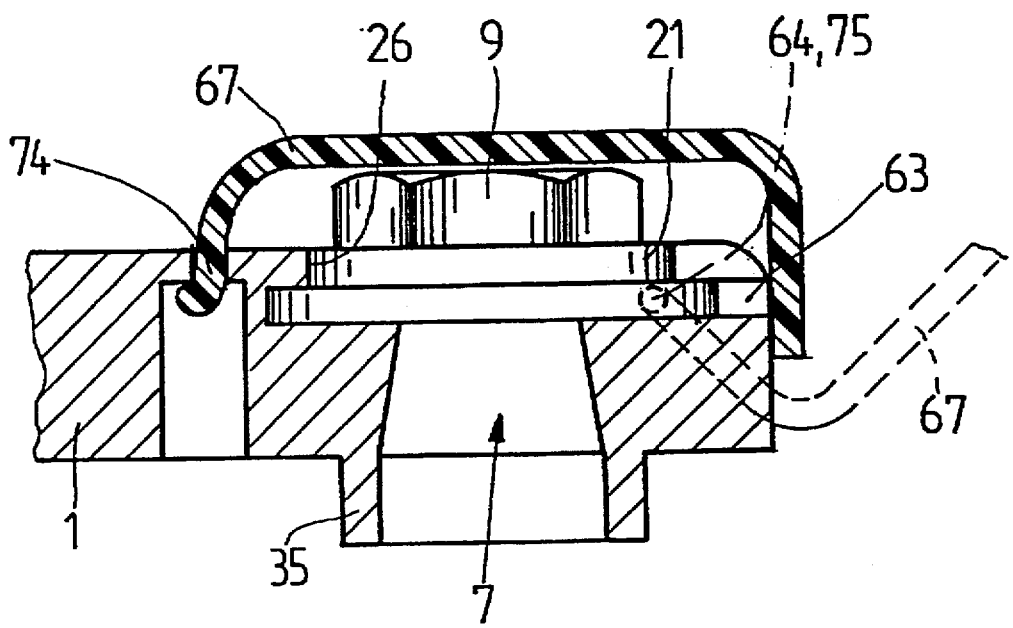
Figure 24A:
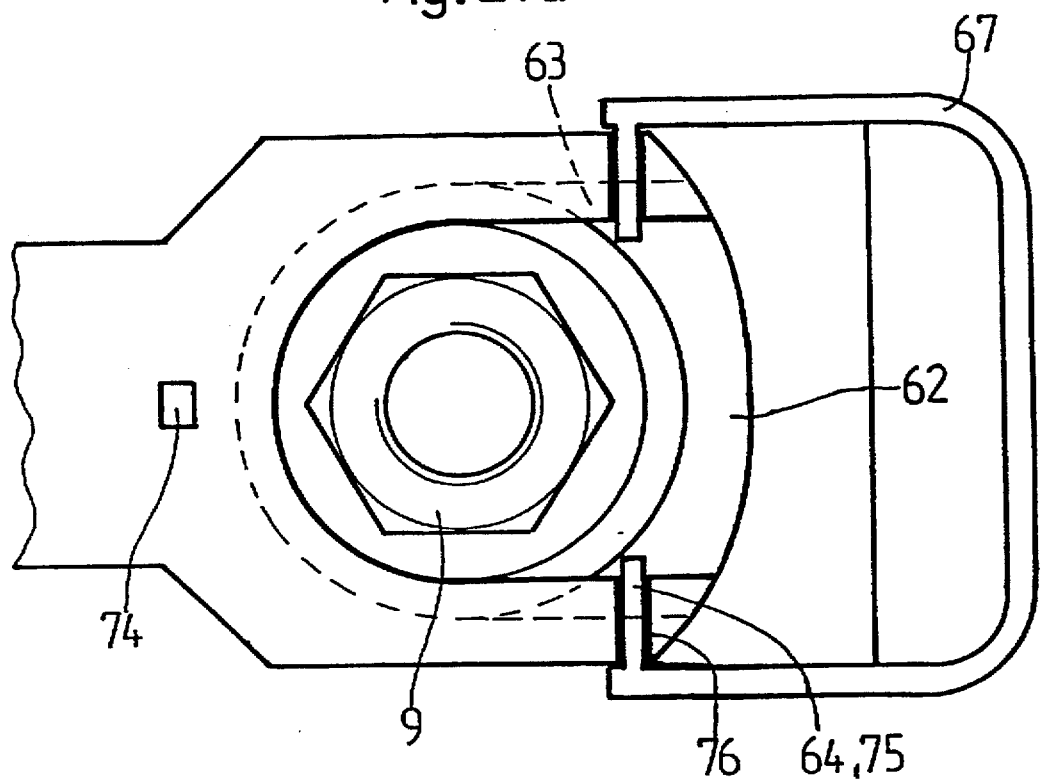

The embodiment shown in FIGS. 24 and 24a essentially corresponds to the one shown in FIG. 23, with FIG. 24a showing a top view of the embodiment according to FIG. 24. The only difference between this embodiment and the embodiment according to FIG. 23 can be seen in the design of the securing element 64. The securing element 64 is formed by two hinge pins 75 that are integrally formed onto the covering cap 67. The hinge pins 75 are axially aligned and are arranged side by side. Flush bores 76 that end in the groove 63 within the insertion region 62 are provided in the mounting part 1 for the hinge pins 75. The hinge pins 75 extend through the bores 76 from the outside and protrude into the groove 63 or the insertion region 62 to such an extent that they prevent the fastening nut 9 from sliding out and hold said fastening nut in the mounting position. The broken lines in FIG. 24 indicate the closed position of the covering cap 67 in which the snap-on tab 73 of the covering cap 67 is snapped into the opening 74.

Figure 25:
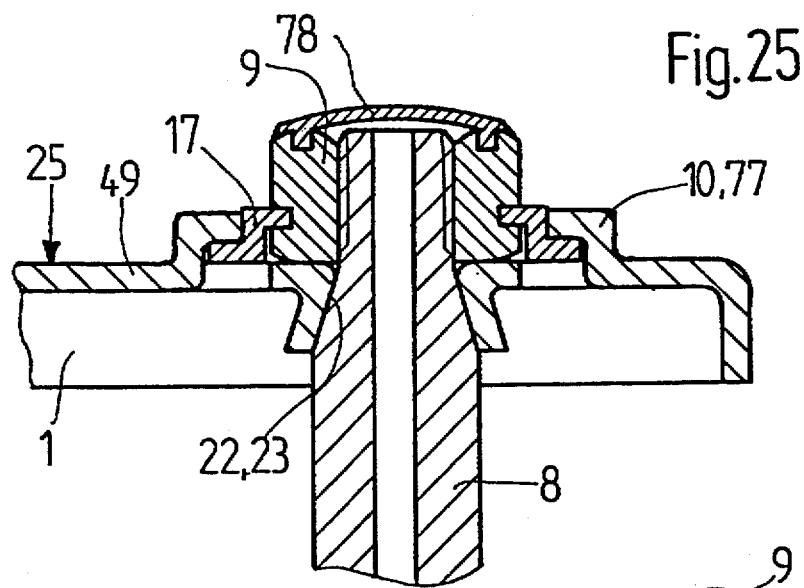
FIGS. 25–26a are additional embodiments of a wiper arm according to the invention with a sheet metal mounting part.
Figure 25A:
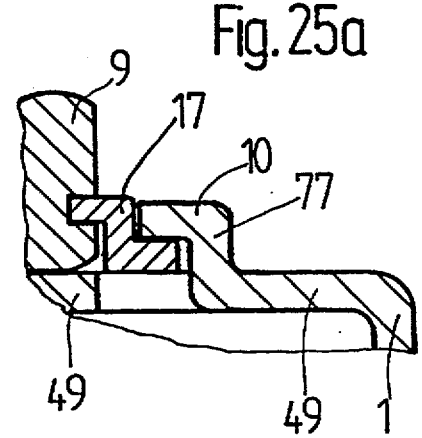

The embodiment according to FIGS. 25 and 25a pertains to a wiper arm according to the invention which comprises a mounting part that has an essentially U-shaped cross section and is realized in the form of a sheet metal part 1. A fastening nut 9, according to FIG. 1d, is used in this embodiment, with the fastening nut 9 being arranged on the upper side 25 of the rear part 49 coaxially to the inner cone 22. The perforated disk 17 used instead of the collar on the fastening nut 9 has a plate-shaped profile, with the lower edge of this perforated disk loosely lying on the upper side 25 of the rear part 49. Four tab-like fastening sections 77 that are distributed over the circumference are bent upward out of the rear part 49 adjacent to the perforated disk 17 of the fastening nut 9. After attaching the fastening nut 9 on the rear part 49, the free ends of the fastening sections 77 are bent radially inward such that they overlap the edge of the perforated disk 17. These fastening sections 77 hold the fastening nut 9 on the mounting part 1 and simultaneously act as a limit stop 10 for the fastening nut 9 so as to ensure its pull-off function. In this embodiment, the fastening nut 9 can either be turned relative to the perforated disk 17 or the perforated disk 17 is rigidly fastened to it, in which case the fastening nut 9 can be turned relative to the fastening sections 77. If a layer of enamel is to be applied to the wiper arm, it is practical to carry out the enameling process after attaching the fastening nut 9 to the mounting part 1 because the enamel will most likely be damaged when the fastening sections 77 are bent. In order to prevent the admission of lacquer into the interior threads of the fastening nut 9, the open face side of the fastening nut 9 can be temporarily closed by means of the covering cap 78 that is removed from the fastening nut 9 after the enameling or at a later time. FIG. 25 also indicates that the wiper arm according to the invention is mounted on a drive shaft 8 that is realized in the form of a hollow shaft. Such a drive shaft 8 can be conventionally utilized as a lead-through for the windshield washing fluid line or be realized as part of a windshield washing fluid line.

FIG. 25a shows an enlarged detail of FIG. 25. This figure clearly shows that the perforated disk 17 is bent downward at a right angle and from the rear part 49 of the mounting part 1 with a fastening section 77 that is initially bent upward and then radially inward over the end part of the perforated disk 17 overlapping the aforementioned perforated disk. For this purpose, the fastening section 77 is initially separated from the remaining rear part 49 on three sides and then bent out of the rear part 49 in the previously described fashion. The end of the fastening section 77 which is bent over the perforated disk 17 acts as a limit stop 10 that ensures the pull-off function of the fastening nut 9.

Figure 26:
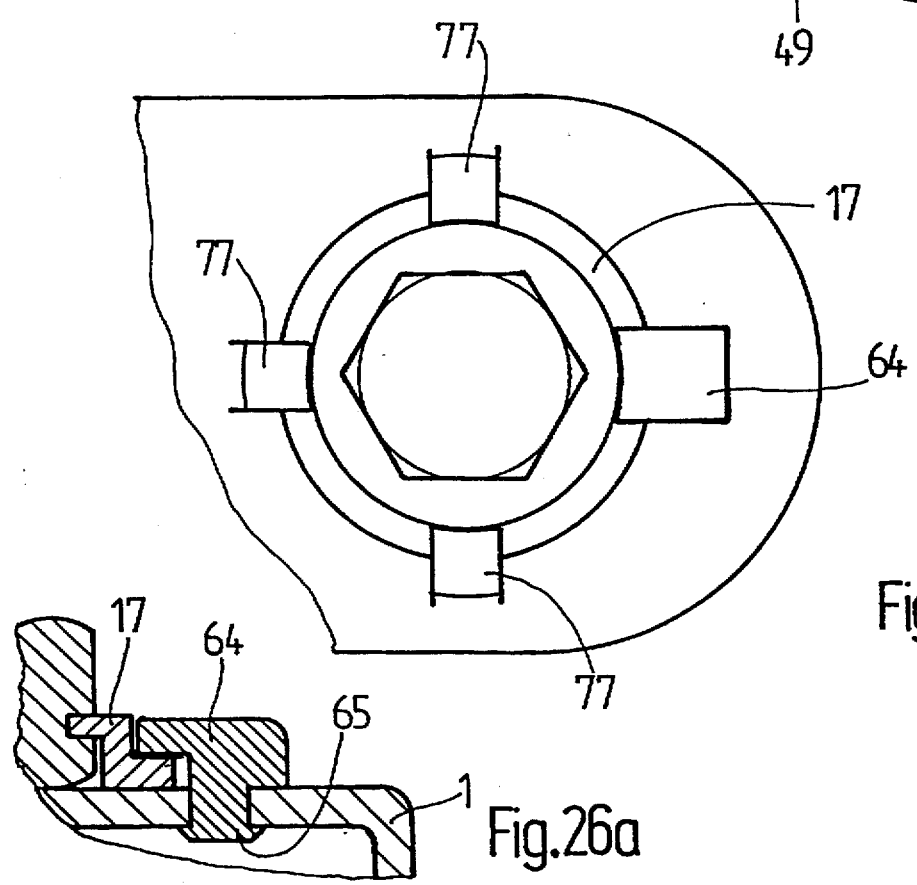
Figure 26A:

FIG. 26 shows a top view of an embodiment that is nearly identical to the one shown in FIG. 25. In contrast to FIG. 25, the right fastening section is omitted in FIG. 26. The three remaining fastening sections 77 were already bent into the corresponding shape before attachment of the fastening nut 9. Due to the omission of the right fastening section, the fastening nut 9 with its perforated disk 17 can be laterally inserted from this side until it is situated underneath the three remaining fastening sections 77. After inserting the fastening nut 9, the insertion region 62 is blocked by means of a securing element 64. The securing element 64 is clearly illustrated in FIG. 26 which shows a detail of FIG. 26 in the form of an enlarged sectional representation. In this case, the securing element 64 is realized in the form of a specially formed part that is arranged on the rear part 49 of the mounting part 1 adjacent to the edge of the perforated disk 17. The securing element 64 is fastened by snapping a snap-on projection 65 that is integrally formed onto the securing element into an opening of the rear part 49. In this case, the wiper arm can be enameled before the fastening nut 9 is attached to the mounting part 1 because no subsequent deformations of the fastening sections or the like are required.

Figure 27:
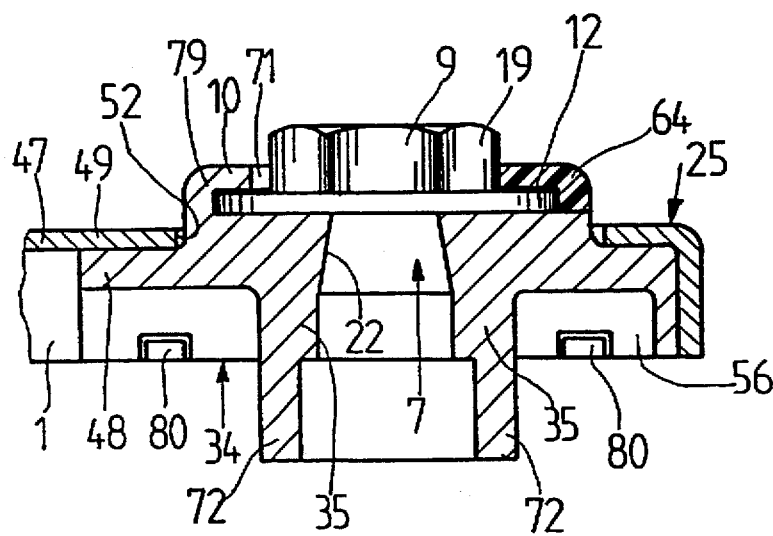

FIG. 27 shows an embodiment in which the mounting part 1 consists of a sheet metal part 47 with a cast metal insert 48. The sheet metal part 47 has an essentially U-shaped cross section, with a relatively large opening 52 being arranged in the rear part 49. The cast metal insert 48 contains the opening 7 that is realized in the form of an inner cone 22 and serves for mounting the wiper arm on the drive shaft 8. A first hollow-cylindrical extension 35 is arranged on the underside 34 axially adjacent to the widened side of the inner cone 22, with a second hollow-cylindrical extension 72 being arranged adjacent to the first hollow-cylindrical extension. The function of these two extensions 35 and 72 was already explained previously with reference to the previous embodiments. A collar 79 is integrally formed on the upper side of the cast metal insert 48. This collar 79 is realized in such a way that it is open toward at least one side and that the fastening nut 9 with its collar 12 can be laterally inserted underneath the collar 79 until the fastening nut 9 is situated in the mounting position. The cast metal insert 48 designed in this way is positively inserted into the sheet metal part 47 from the bottom, with the upper part of the cast metal insert 48 protruding upwardly from the recess 52 that contains the collar 79. The cast metal insert 48 is held on the sheet metal part 47 by means of holding tabs 80. These holding tabs 80 are integrally formed onto the lower edge of the side walls 56 of the sheet metal part 47 and bent around the lower edge of the cast metal insert 48 such that they engage into corresponding recesses in the cast metal insert 48 at this location. The upper part of the cast metal insert 48 protrudes from the upper side 25 of the sheet metal part 47 at least to such an extent that the fastening nut 9 with its collar 12 can be laterally inserted underneath the collar 79. After insertion of the fastening nut 9, the insertion region is blocked by a securing element 64. The securing element 64 consists of a formed part that entirely closes the lateral insertion opening of the collar 79 and supplements the outer contour of the upper part of the cast metal insert so as to form a complete unit. The part 19 of the fastening nut 9 for attaching a tool protrudes at least partially from the collar 79 toward the top. A sufficiently wide circumferential gap 71 that allows the attachment of a wrench exists between the part 19 of the fastening nut 9 and the collar 79 or the securing element 64. The inwardly directed edge of the collar 79 acts as a limit stop 10 for the collar 12 of the fastening nut 9 and consequently ensures the function of the fastening nut 9.

Figure 28:
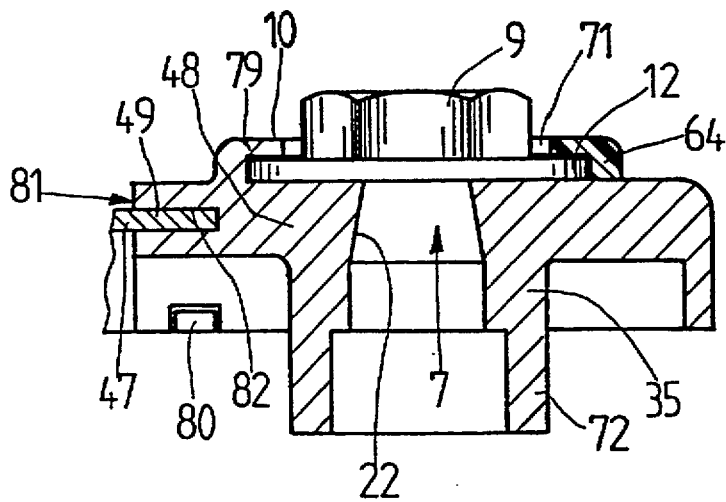

The embodiment shown in FIG. 28 only differs slightly from the embodiment according to FIG. 27. The cast metal insert 48 is essentially identical and fulfills the same functions. In order to fasten the cast metal insert 48 on the sheet metal part 47, a slot-like groove 82 is arranged in one wall surface of the cast metal insert 48. The cast metal insert 48 is attached to the sheet metal part 47, in particular, its rear part 49, by this groove 82 and held on the sheet metal part 47 by means of bent holding tabs 80 of the sheet metal part 47.

Figure 29:
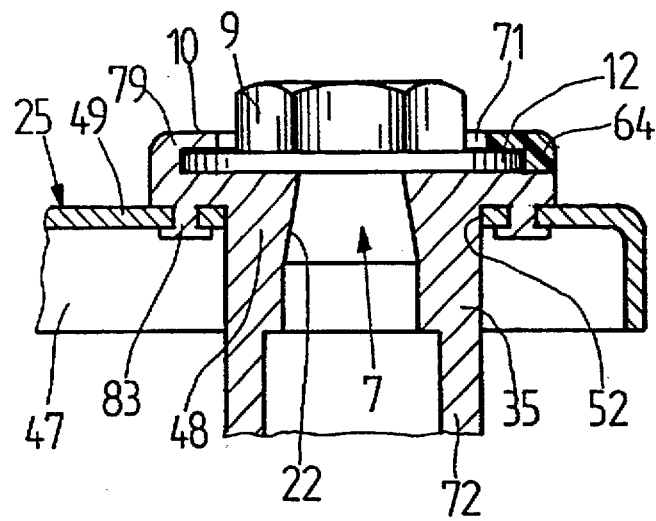
FIGS. 27–30a are additional embodiments of a wiper arm according to the invention with a sheet metal mounting part and a cast metal insert.

In the embodiment shown in FIG. 29, the cast metal insert 48 is essentially designed identically to the embodiment shown in FIGS. 27 and 28. The only difference can be seen in the method for fastening the cast metal insert 48 on the sheet metal part 47. In this case, the cast metal insert 48 is inserted into the rear part 49 from the top in such a way that rivet pins 83 that are integrally formed onto the underside of the cast metal insert 48 extend through corresponding openings in the rear part of 49 of the sheet metal part 47, with said rivet pins being riveted on the underside of the rear part 49. The lower part of the cast metal insert 48 which contains the main part of the opening 7 and the hollow-cylindrical extensions 35 and 72 extends through the opening 52 in the rear part 49 of the sheet metal part.

Figure 30:
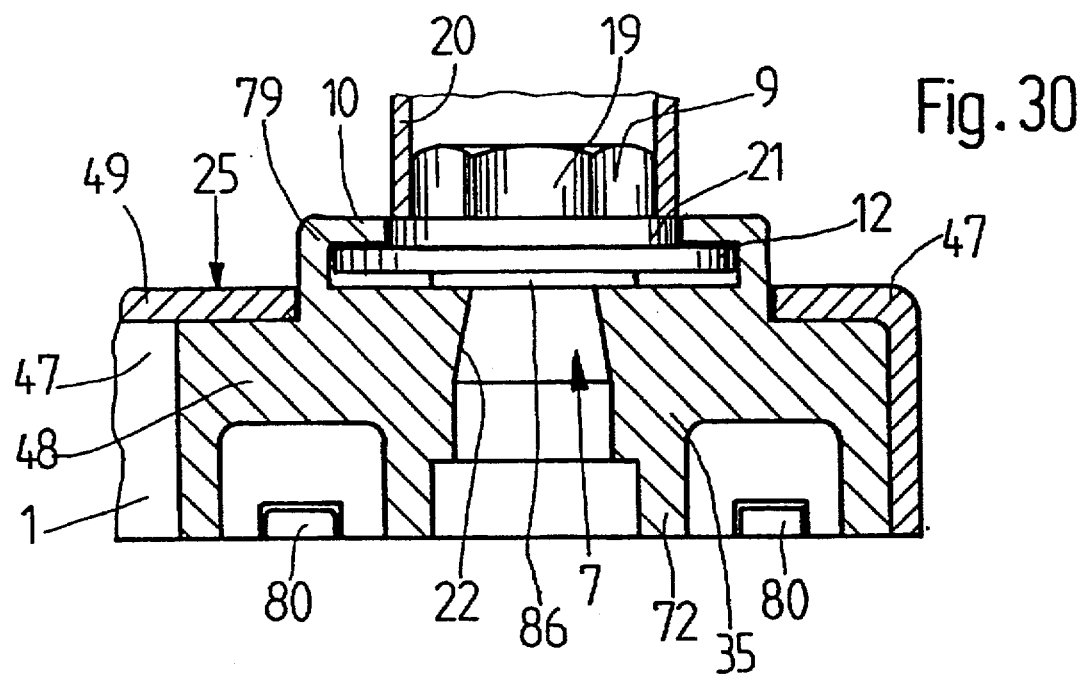
Figure 30A:
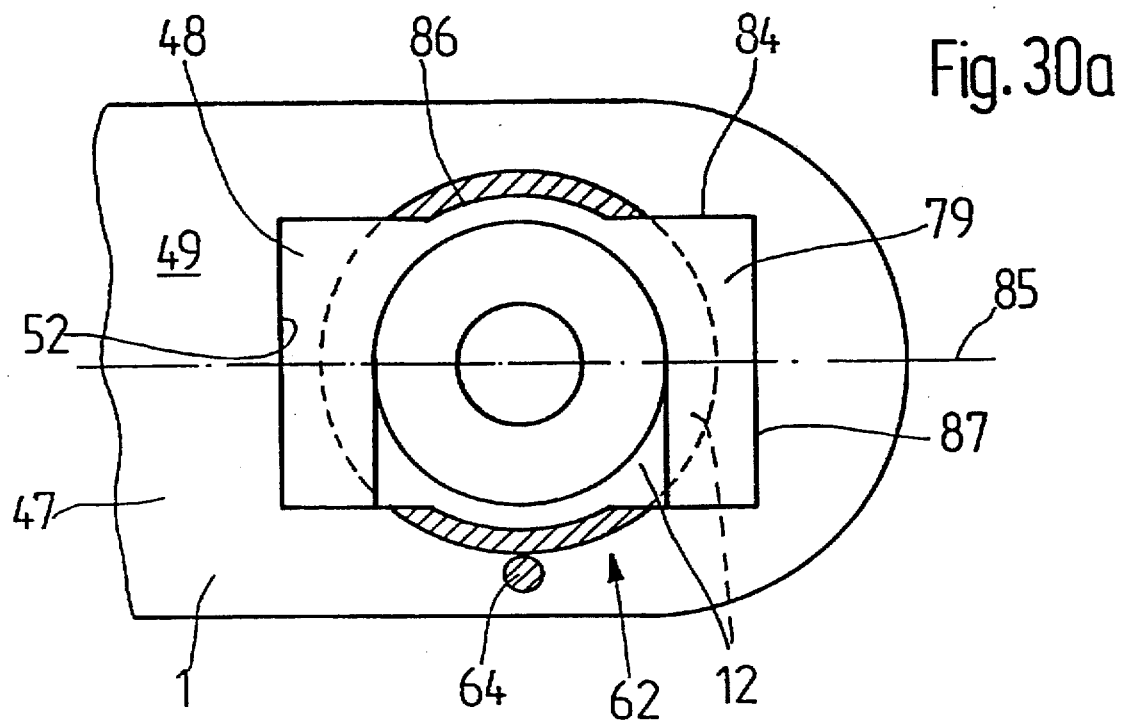

In the embodiment according to FIGS. 30 and 30a, in which FIG. 30a shows a top view of FIG. 30, the mounting part 1 is also formed by a sheet metal part 47 with a cast metal insert 48. The opening 52 arranged in the rear part 49 of the sheet metal part 47 has an essentially rectangular shape, with the longitudinal sides 84 being aligned parallel to the longitudinal axis 85 of the mounting part 1. Within its central region, the longitudinal sides 84 of the opening 52 extend upward in the form of an arc, with the diameter of these arc-like sections of the longitudinal sides 84 being slightly smaller than the diameter of the collar 12 of the fastening nut 9. On the side situated opposite to the insertion region 62, the collar 79 is radially open at least on its underside as shown in FIG. 30a. This is realized in such a way that the collar 12 of the fastening nut 9 protrudes from the collar 79 at this location, with the part of the collar 79 that overlaps the collar of the fastening nut remaining intact within this region. Consequently, it is ensured that the fastening nut 9 subsequently not only presses against the cast metal insert 48, but also against the upper side 25 of the sheet metal part 47 within the ring segments 86 that are indicated by the hatching in FIG. 30a. The cast metal insert 48 is inserted into the sheet metal part 47 from the bottom. For this purpose, the upper part of the cast metal insert 48 with the collar 79 formed thereon has a shape that corresponds to the opening 52. The positive connection between the cast metal insert 48 and the sheet metal part 47 is completed by means of bent holding tabs 80 of the sheet metal part 47. In contrast to the embodiments according to FIGS. 27–29, the collar 79 is open perpendicular to the central longitudinal axis 85 of the mounting part 1. The fastening nut 9 with its collar 12 is inserted into the mounting position underneath the collar 79 from this side. The insertion region 62 is blocked by means of a securing element 64 as shown in FIG. 30a. In FIG. 30a, the entire fastening nut 9 is not shown for reasons of improved clarity. This figure only shows the collar 12 of the fastening nut. The shape or design of the fastening nut 9 is clearly illustrated in FIG. 30. In this embodiment, the fastening nut 9, according to FIG. 1e, is used. The collar 79 overlaps the collar 12 of the fastening nut 9 such that the collar acts as a limit stop 10 and ensures the pull-off function of the fastening nut 9. In order to prevent damage to the mounting part 1 within the region of the collar 79 from a wrench 20 that may be attached to the part 19 of the fastening nut 9 and simultaneously to keep the gap between the fastening nut 9 in the collar 79 as small as possible, the cylindrical shaft 21 of the fastening nut 9 is essentially arranged inside the collar 79 and only protrudes slightly from this collar. In order to achieve an even more reliable positive connection between the sheet metal part 47 and the cast metal insert 48, the narrow sides 87 of the opening 52 as well as the corresponding narrow sides of the upper part of the cast metal insert 48 can be provided with toothing (not illustrated in FIGS. 30 and 30a).

We claim:

1. A wiper arm assembly, comprising:

a drive shaft mounted to a wiper arm, wherein said drive shaft includes a frustaconical surface and a threaded portion at an end of the frustaconical surface, wherein said wiper arm includes an arm mounting part having an opening with a frustaconical surface configured to receive the frustaconical surface of the drive shaft from a first side of the arm;

a threaded fastener element having a threaded portion in threaded engagement with the threaded portion of the drive shaft from a second side of the arm opposite the first side; and a limit stop axially connecting the threaded fastener element and the arm mounting part yet enabling relative rotative movement therebetween wherein rotation of the threaded fastener relative to the drive shaft axially displaces the fastener and the limit stop axially relative to the drive shaft thereby axially displaces the fastener and the limit stop axially relative to the drive shaft thereby axially displacing the arm mounting part relative to the drive shaft, wherein the threaded fastener element is a nut located on the second side of the arm mounting part and the threaded portion of the drive shaft is a threaded stud extending from the end of the frustaconical surface and the nut has a radially extending flange fixed thereto for axial movement therewith and an aperture in the arm mounting part, receives the nut and the limit stop axially connects the flange with the arm mounting part, wherein the arm mounting part has a recess in the second side with a base at its bottom and the nut being disposed therein with the limit stop disposed on a side of the flange opposite the base, wherein there are two limit stops with the limit stops being two pins disposed in bores through a wall in the arm mounting part defining the recess on opposing sides of the nut, wherein the pins are selectively removable from the arm mounting part and can be selectively replaced, wherein the pins are parallel and are connected to each other at one end in a fork shape.

2. A wiper arm mounting system as claimed in claim 1 wherein the radially extending flange is a collar formed integrally with the nut.

* * * * *